United States Patent
Funabe et al.

Patent Number: 6,016,350
Date of Patent: Jan. 18, 2000

[54] ENCRYPTION APPARATUS FOR ENABLING ENCRYPTION AND NON-ENCRYPTION TERMINALS TO BE CONNECTED ON THE SAME NETWORK

[75] Inventors: Chieko Funabe; Yoshimasa Baba; Shoichiro Seno; Yuuji Koui, all of Tokyo, Japan

[73] Assignee: Mitsubishi Denki Kabushiki Kaisha, Tokyo, Japan

[21] Appl. No.: 08/853,919

[22] Filed: May 9, 1997

[30] Foreign Application Priority Data

Jun. 28, 1996 [JP] Japan ................................. 8-169950

[51] Int. Cl.[7] ............................. H04L 9/00; H04L 9/32; H04K 1/00
[52] U.S. Cl. ............................... 380/49; 380/42; 380/45
[58] Field of Search .................................. 380/49, 215.6, 380/215.7, 215.8, 224.4, 42, 45

[56] References Cited

U.S. PATENT DOCUMENTS

| | | | |
|---|---|---|---|
| 4,881,263 | 11/1989 | Herbison et al. | 380/21 |
| 4,924,513 | 5/1990 | Herbison et al. | 380/21 |
| 5,052,040 | 9/1991 | Preston et al. | 380/4 |
| 5,161,192 | 11/1992 | Carter et al. | 380/48 |
| 5,303,303 | 4/1994 | White | 380/49 |
| 5,351,295 | 9/1994 | Perlman et al. | 380/23 |
| 5,365,590 | 11/1994 | Brame | 380/49 |
| 5,369,707 | 11/1994 | Follendore, III | 380/25 |
| 5,386,470 | 1/1995 | Carter et al. | 380/48 |
| 5,386,471 | 1/1995 | Bianco | 380/49 |
| 5,444,782 | 8/1995 | Adams, Jr. et al. | 380/49 |
| 5,548,646 | 8/1996 | Aziz et al. | 380/23 |
| 5,548,649 | 8/1996 | Jacobson | 380/49 |
| 5,579,394 | 11/1996 | Waldron, Jr. et al. | 380/49 |
| 5,615,266 | 3/1997 | Altschuler et al. | 380/21 |
| 5,629,981 | 5/1997 | Nerlikar | 380/25 |
| 5,640,456 | 6/1997 | Adams, Jr. et al. | 380/49 |
| 5,659,615 | 8/1997 | Dillon | 380/21 |
| 5,878,056 | 3/1999 | Black et al. | 371/32 |
| 5,881,243 | 3/1999 | Zaumen et al. | 395/200.71 |
| 5,883,891 | 3/1999 | Williams et al. | 370/356 |

FOREIGN PATENT DOCUMENTS

| | | | |
|---|---|---|---|
| 0464563 | 1/1992 | European Pat. Off. | H04L 29/06 |
| 0769864A2 | 4/1997 | European Pat. Off. | H04L 12/56 |
| 63-155930A | 6/1988 | Japan . | |
| 4-154233 | 5/1992 | Japan | H04H 9/00 |

*Primary Examiner*—Tod R. Swann
*Assistant Examiner*—James W. Myhre

[57] ABSTRACT

An encryption apparatus enables encrypted communications using existing network equipment which does not have an encryption function, such as a server, a client, or a router. The encryption apparatus is connected to a section between a terminal and a network, data from the terminal is encrypted and sent to the network, data from the network is decrypted and sent to the terminal, and a connection control frame between the terminal and the network is not encrypted.

35 Claims, 27 Drawing Sheets

| 11c | CLIENT WITH NON-ENCRYPTION SYSTEM |
|---|---|
| 12c | CLIENT WITH ENCRYPTION SYSTEM |
| 11s | FILE SERVER WITH NON-ENCRYPTION SYSTEM |
| 12s, 13s | FILE SERVER WITH ENCRYPTION SYSTEM |

11c  CLIENT WITH NON-ENCRYPTION SYSTEM

12c  CLIENT WITH ENCRYPTION SYSTEM

11s  FILE SERVER WITH NON-ENCRYPTION SYSTEM 12s, 13s  FILE SERVER WITH ENCRYPTION SYSTEM

| SERVER TABLE STORED BY 11s | | |
|---|---|---|
| SERVER NAME | SERVICE TYPE | NUMBER OF HOPS |
| 11s | 0x04 | 0x01 |
| 12s | 0x04 | 0x06 |

52

| SERVER TABLE STORED BY 12s | | |
|---|---|---|
| SERVER NAME | SERVICE TYPE | NUMBER OF HOPS |
| 11s | 0x04 | 0x01 |
| 12s | 0x04 | 0x01 |

53

| | |
|---|---|
| 11c | CLIENT WITH NON-ENCRYPTION SYSTEM |
| 12c | CLIENT WITH ENCRYPTION SYSTEM |
| 11s | FILE SERVER WITH NON-ENCRYPTION SYSTEM |
| 12s, 13s | FILE SERVER WITH ENCRYPTION SYSTEM |

- (1) ENCRYPTION SYSTEM BETWEEN TERMINALS
- (2) ENCRYPTION SYSTEM WITHIN NETWORK
- NW11,NW12,NW13  NETWORK
- 21,22  COMMUNICATION PATH
- 111,112,121,122,131,132  TERMINAL

- N1,N2,N3  ENCRYPTION SYSTEM WITHIN NETWORK
- T1,T2,T3  ENCRYPTION SYSTEM BETWEEN TERMINALS

ENCRYPTION APPARATUS FOR ENABLING ENCRYPTION AND NON-ENCRYPTION TERMINALS TO BE CONNECTED ON THE SAME NETWORK

FIELD OF THE INVENTION

The present invention relates to an encryption apparatus which connects a plurality of servers and/or client terminals (hereinafter "clients") to a network, and which encrypts data to execute interactive communications.

BACKGROUND OF THE INVENTION

In a conventional encryption apparatus, all received frames are encrypted before transmission, such that control frames, which are used to control operation of a network system, are also encrypted. Consequently, control frames cannot be exchanged between network equipment or terminals having an encryption function and those without an encryption function. Furthermore, when a frame is relayed through the network equipment, the network equipment must have an encryption function like the encryption apparatus disclosed in Japanese Patent Laid-Open Publication No. HEI 4-154233. FIG. 29 shows such a system configuration. In FIG. 29, reference numeral (1) designates an encryption system used between terminals, (2) designates an encryption system used within a network, NW11, NW12, NW13 designate a network, 21, 22 designate a communication path, 31, 32, 33 designate network equipment such as a bridge or the like, and 111, 112, 121, 122, 131, 132 designate a terminal respectively.

Next, the operation of the conventional configuration is described. FIG. 30 is a frame diagram showing an encrypted range of an IP (Internet Protocol) frame as an example. In the transmitting terminal 111, the encryption system (1) used between terminals is applied for only information required for communication with a receiver's terminal 121, and the encryption system (2) used within a network is applied for information required for transfer processing through the networks NW11, NW12, or the network equipment 31, 32 or the like. Specifically, the transmitting terminal 111 encrypts the sections N1, N2, N3 shown in FIG. 30 according to the encryption system (2) within the network for information used only within the network, such as network addresses or the like of the network equipment 31, 32 connecting the network NW11 to which the transmitting terminal 111 belongs and the network NW12 to which the receiver's terminal belong. The transmitting terminal 111 also encrypts the sections T1, T2, T3 shown in FIG. 30 according to the encryption system (1) between the terminals for information used only between the terminals (111, 121) to send the encrypted sections to the network NW11 to which the terminal 111 belongs as one message unit.

The network equipment 31, connected to the network NW11 receives the message, decrypts the sections N1, N2, N3 used in the network NW11 to transfer the message to the network equipment 32 connected to the network NW12 to which the receiver's terminal 121 belongs. The network equipment 32 also decrypts the sections N1, N2, N3 used in the network NW12 to transfer the message to the network. The receiver's terminal 121 belonging to the network NW12 decrypts the sections N1, N2, N3 used in the network in the message received from the network equipment 32 according to the encryption system (2) used in the network, and checks that the message is addressed to its own terminal 121 to decrypt the sections T1, T2, T3, each of which is information for the terminals according to the encryption system (1) between the terminals.

In the conventional encryption apparatus, an encryption system is separated into a unit between network devices and a unit between terminals. By decrypting sections required for a relay, each of the network devices encrypts message-communications executed between the terminals through a network which includes the network equipment, whereby a communication concealing system for executing normal communications between the terminals can be provided.

As described above, the encryption apparatus based on the conventional technology cannot exchange control frames for a network system with network equipment or a terminal which does not have an encryption function because the apparatus also encrypts the network system control frame.

SUMMARY OF THE INVENTION

It is an object of the present invention to provide an encryption apparatus in which encryption communications can be executed using network equipment without an encryption function such as servers, clients, or routers or the like now in use.

It is also an object of the present invention to provide an encryption apparatus in which a client having an encryption apparatus connected thereto can access a server which does not have encryption apparatus connected thereto.

An encryption apparatus according to the present invention comprises an encryption service means for receiving from a terminal a frame which indicates server information, and converting a service type to cryptocommunication, when the service type of a server included in the server information indicates non-cryptocommunication, to send the frame to a network; a non-encryption service means for receiving a frame which indicates server information from the network and converting the service type thereof, when the service type of the server information indicates cryptocommunication, to non-cryptocommunication to send the frame to the terminal, and also for aborting the service information or converting a hop number indicating the number of relayed routers to an unattainable value, if the service type thereof is non-cryptocommunication, to send the frame to the terminal; an encryption means for receiving a data frame from the terminal, and encrypting a specified data section included in the data frame to send the data section to the network; a decrypting means for receiving a data frame from the network and decrypting a specified data section included in this data frame to send it to the terminal; and a communication path information relaying means for receiving a frame which indicates communication path information from the terminal, sending the frame to the network, and receiving a frame which includes communication path information from the network to send the frame to the terminal.

An encryption apparatus according to the present invention comprises a transparent processing address table for storing therein an address not to be encrypted; an encryption means for receiving a data frame from a terminal and sending the data frame to a network, if a receiver's server address for this data frame has been registered in the transparent processing address table, without encrypting the specified data section of the data frame, or by encrypting the specified data section of the data frame, if the receiver's server address of the data frame has not been registered in the transparent processing address table; a decrypting means for receiving a data frame from the network and sending the data frame to the terminal, if a sender's address of the data frame has been registered in the transparent processing address table, without decrypting the specified data section of the data frame, or by decrypting the specified data section of the data frame, if the sender's address of the data frame has not been registered in the transparent processing address table; a transparent processing server table for storing therein server information for a server for which encrypting is not required; a server information indicating frame transparent processing means for receiving a frame which indicates server information from the network and sending the frame to the terminal depending on a result of comparison between a server name included in server information for this frame and a server name stored in the transparent processing server table; and a communication path information relaying means for receiving a frame indicating communication path information from the terminal, sending this frame to the network, and also for receiving a frame indicating communication path information from the network and sending the frame to the terminal.

An encryption apparatus according to the present invention comprises a hop number adding means for receiving a frame which indicates server information from a terminal and sending a frame obtained by adding a specified number to a hop number included in server information for this frame to a network; an initialization request reply means for receiving a frame requesting server information for a destination for connection when initialized from the terminal and sending a frame which indicates server information for a specified destination for connection to the terminal; an aborting means for receiving a frame requesting server information for a connection destination when initialized from the network and aborting the frame; an encryption means for receiving a data frame from the terminal, and encrypting a specified data section of the data frame to send the data frame to the network; a decrypting means from receiving a data frame from the network, decrypting a specified data section of the data frame, and sending the decrypted data section to the terminal; and a communication path information relaying means for receiving a frame which indicates communication path information from the terminal, sending the frame to the network, and also for receiving a frame which indicates communication path information from the network and sending the frame to the terminal.

Other objects and features of this invention will become understood from the following description with reference to the accompanying drawings.

DESCRIPTION OF THE PREFERRED EMBODIMENTS

In accordance with present embodiments, interactive communication, without encryption, between a client and a server can be executed via a network connection, and encryption communication between encryption apparatuses can also be executed by connecting the client and the server to the network through an encryption apparatus.

An example is described in which the embodiment is applied to a protocol used in NetWare (a trademark of Novell Co.) as a network OS (Operating System) for a personal computer.

Figure 2:
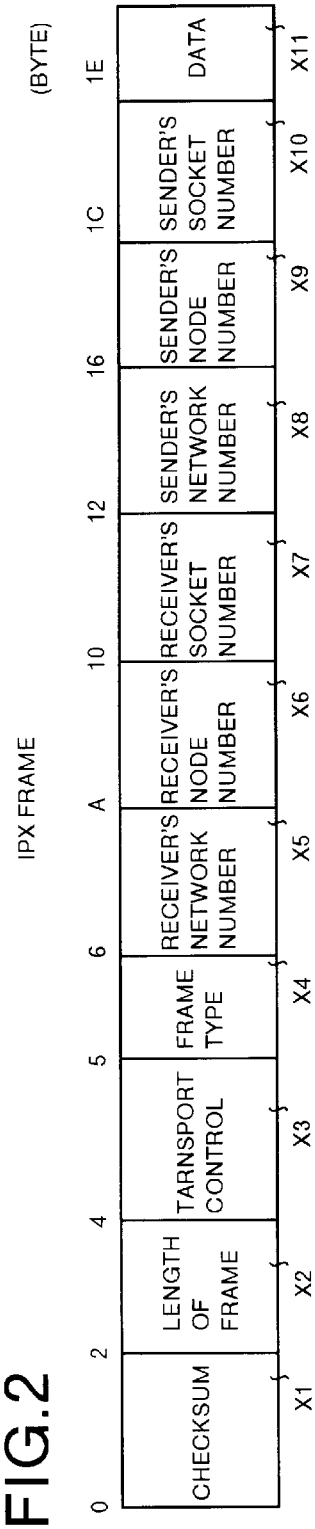
FIG. 2 is a view showing a format of IPX frame.

In NetWare, the IPX (Internetwork Packet Exchange) protocol is used as a network layer protocol. FIG. 2 shows an IPX frame. In FIG. 2, reference numeral X1 designates a checksum, X2 designates frame length, X3 designates a transport control for counting a router through which the frame passes, X4 designates a frame type, X5 designates a receiver's network number of the frame, X6 designates a receiver's node number for specifying a receiver's terminal, X7 designates a receiver's socket number indicating the receiver's protocol, X8 designates a sender's network number, X9 designates a sender's node number for specifying a sender's terminal, X10 designates a sender's socket number indicating the sender's protocol, and X11 designates a data section. The IPX frame identifies a data type of the data section X11 according to the receiver's socket number X7.

Network relaying equipment, such as a router, stores a routing table for relaying the received frame to a receiver's network indicated therein. When the receiver's network of the received frame is not identical to the network having received the frame, the relaying equipment searches for the routing table stored therein to relay the received frame according to routing information on the table. If the routing table has no routing information for the receiver's network, the relaying equipment does not relay the frame. The routing information is periodically exchanged between a router and servers using the RIP (Routing Information Protocol) protocol or when there is any change therein. The RIP protocol is positioned in a higher level than the IPX protocol and is identified when it is checked that the receiver's socket number (X7 in FIG. 2) in the IPX header is a number of 0×453 (0× indicates a hexadecimal digit hereinafter).

Figure 3:
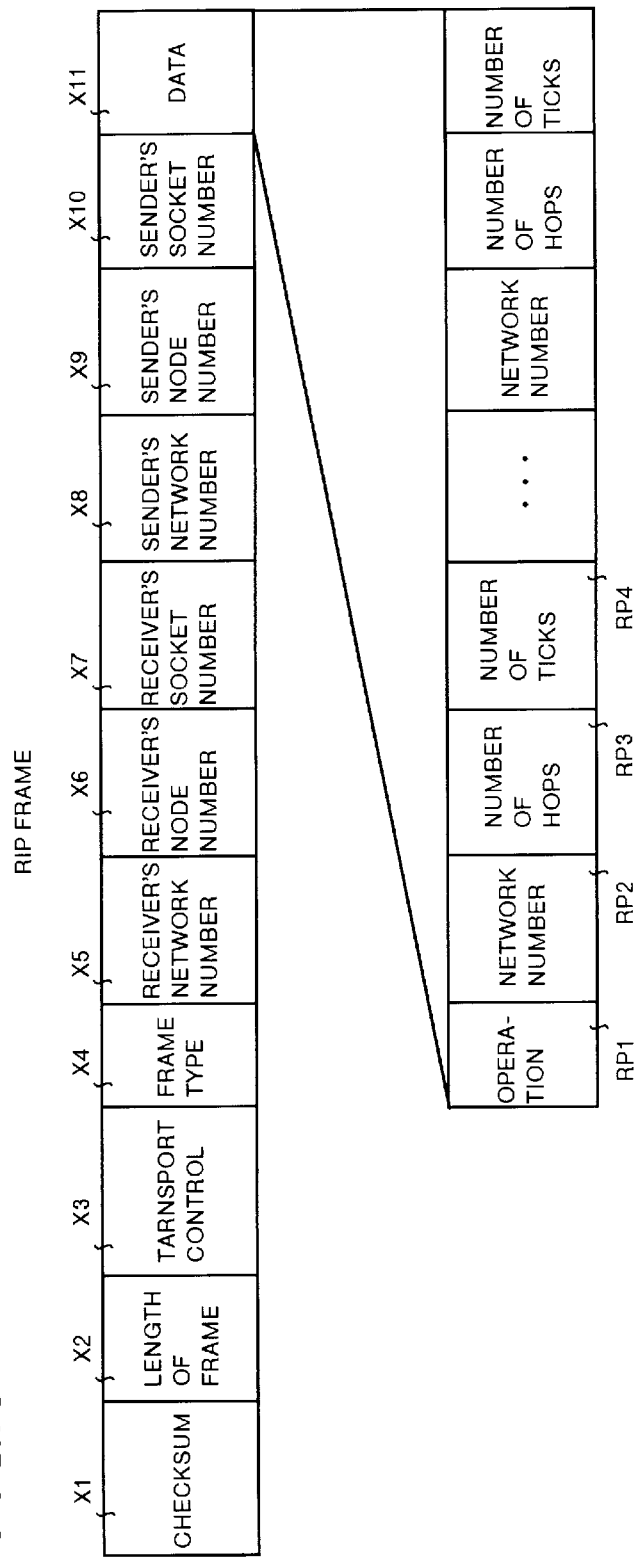
FIG. 3 is a view showing a frame format of RIP request.

FIG. 3 shows a frame format of the RIP. In FIG. 3, reference numeral RP1 designates an operation for identifying whether the frame is a request or a response, RP2 designates a network number, RP3 designates the number of Hops indicating the number of networks through which the frame passes to reach the target network, and RP4 designates the number of ticks indicating a period time required for reaching the target network. The number of Hops is obtained by counting a number from 0×01 and incremented by 1 each time the frame passes through a router. When the number of Hops in the RP3 is 0×10, the network indicated in RP2 means unattainable, which makes the information invalid. Information in RP2 to RP4 constitutes one unit of routing information, so that a plurality of routing information can be set in one frame. Other sections in FIG. 3 are the same as those in FIG. 2, and thus description thereof is omitted herein.

NetWare is a client/server system, and the server broadcasts services provided thereby. Server information is exchanged between a router and servers using the SAP (Service Advertising Protocol) protocol or when there is any change therein. A router or a server stores the received server information in a server table for responding to the received request. The SAP protocol is at a higher level than the IPX protocol, and is identified when the receiver's socket number (X7 in FIG. 2) in the IPX header is 0×452.

Figure 4:
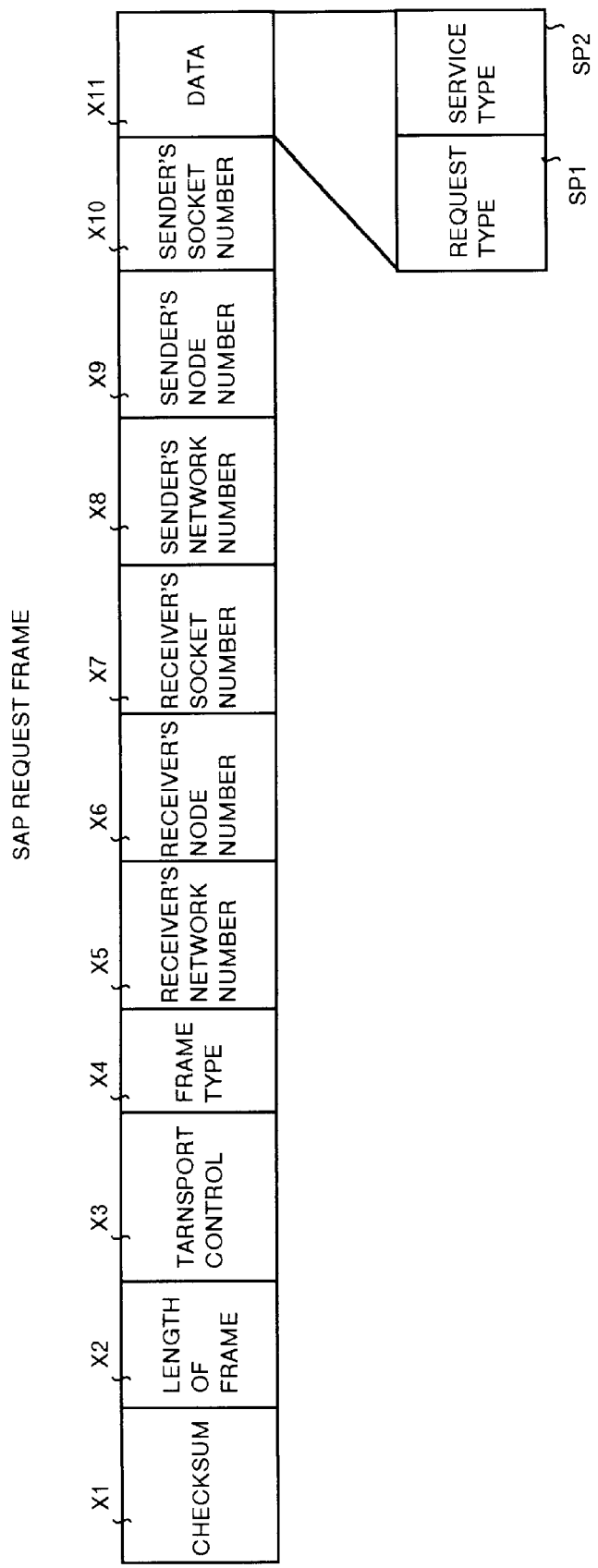
FIG. 4 is a view showing a frame format of SAP request.
Figure 5:
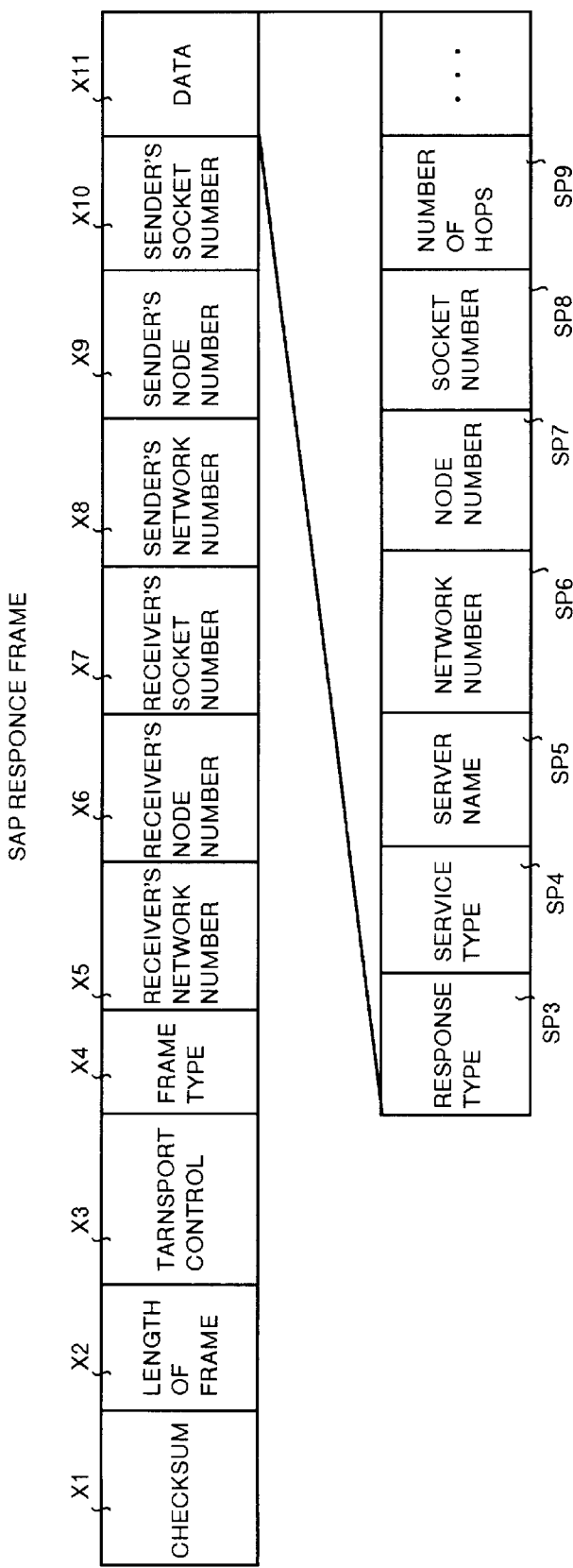
FIG. 5 is a view showing a frame format of SAP response.

There are two frame format for the SAP; a request frame and a response frame. FIG. 4 shows a request frame format for the SAP, and FIG. 5 shows a response frame format for the SAP. In FIG. 4, reference numeral SP1 designates a request type, and SP2 designates a service type to request. Other sections in FIG. 4 are the same as those in FIG. 2, and thus description thereof is omitted herein.

There are two types of SAP request frames; General Request and Nearest Service Query which is sent from a client at start up. The type is identified according to a value of the request type SP1. In FIG. 5, reference numeral SP3 designates a response type, SP4 designates a service type, SP5 designates a server name, SP6 designates a network number as an address of a server, SP7 designates a node number, SP8 designates a socket number, and SP9 designates the number of Hops indicating the number of relayed networks to reach a server. Other sections in FIG. 5 are the same as those in FIG. 2, and thus description thereof is omitted herein.

A case where the number of Hops in SP9 is 0×10 indicates that the server shown in the server name SP5 is unusable. There are two types of response frames, a response to a request and a frame for periodically broadcasting server information. The type is identified according to the response type SP3. Information in SP4 to SP9 constitutes one unit of server information for a server, so that a plurality of server information can be set in one frame.

In this embodiment, an encryption apparatus identifies a protocol, sends an RIP frame and an SAP frame in NetWare without encryption, changes a service type value of a server included in the SAP frame to encryption service values. An encryption apparatus receiving the SAP frame which includes the server information decrypts the values to the values for the original service type of the non-encryption service. For data frames other than the sections described above, the data section X11 shown in FIG. 2 is encrypted.

Figure 1:
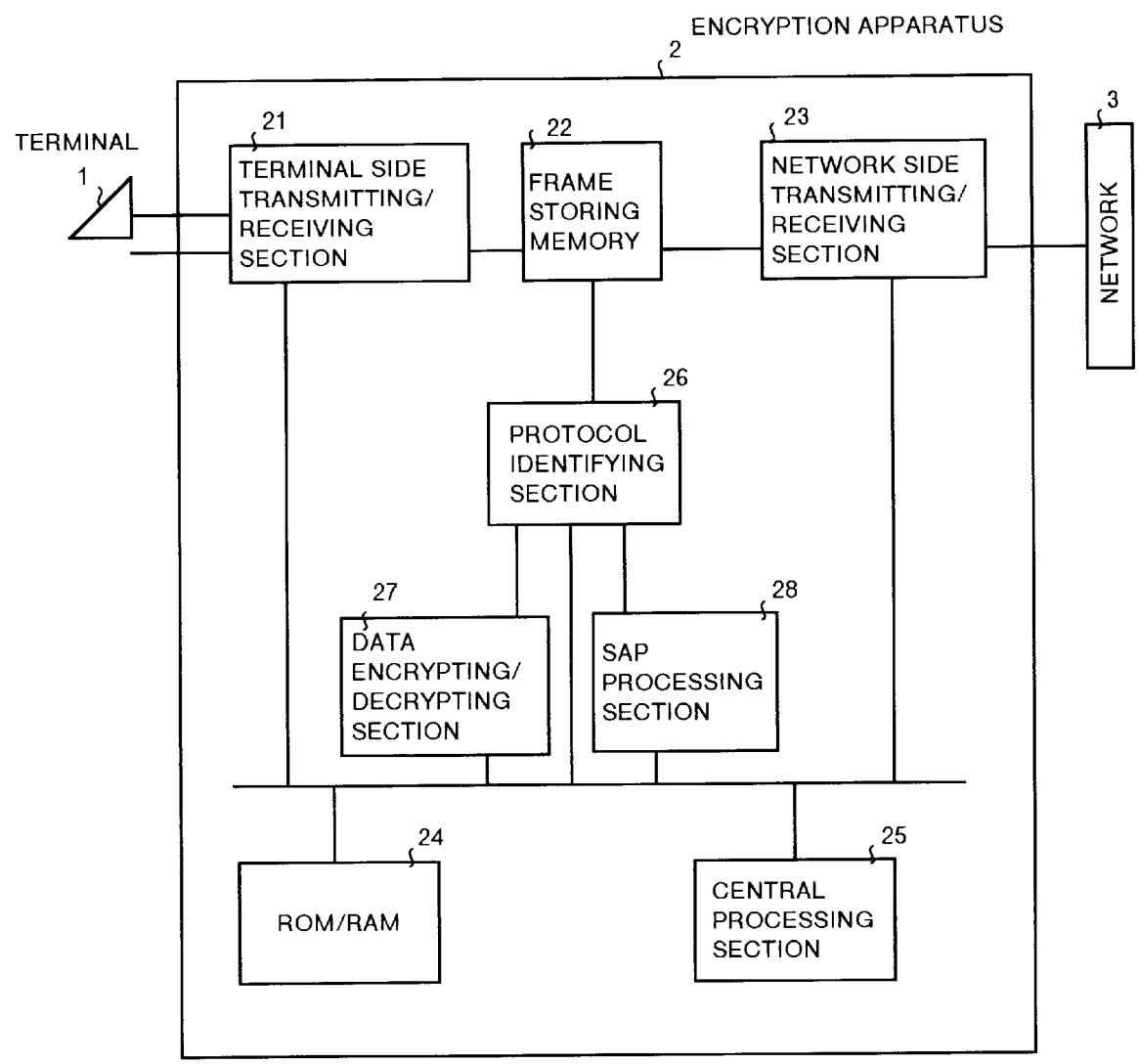
FIG. 1 is a view showing configuration of an encryption apparatus according to Embodiment 1 of the present invention.

FIG. 1 shows the encryption apparatus configuration according to the first embodiment. In FIG. 1, reference numeral 1 designates a terminal, 2 designates an encryption apparatus, and 3 designates a network. Reference number 21 indicates a terminal side transmitting/receiving section with one or more ports for executing data transaction between the terminal connected to the port and the apparatus. The reference numeral 23 indicates a network side transmitting/receiving section for executing data transaction between a network and the apparatus. Also, reference numeral 22 designates a frame storing memory for storing a received frame, 24 designates ROM/RAM for storing the program as well as for providing working memory, 25 designates a central processing section for performing various types of computation. Still further, reference numeral 26 designates a protocol identifying section for identifying a protocol of the received data, 27 designates a data encrypting/decrypting section for encrypting/decrypting the received data, 28 designates an SAP processing section for changing a service type from an non-encryption service to an encryption service if the type is an SAP frame from a terminal, and changing the service type from an encryption service to an non-encryption service if the type is an SAP frame from a network.

Next the operation of the first embodiment is described. In FIG. 1, the terminal side transmitting/receiving section 21 in the encryption apparatus stores the received frame in the frame storing memory 22. The network side transmitting/receiving section 23 stores the received frame in the frame storing memory 22. The protocol identifying section 26 identifies a frame protocol, sends the frame if it is an RIP frame, and transfers the frame to the SAP processing section 28 if it is an SAP frame.

The SAP processing section 28 converts a service type 0x04 (non-encryption service), when receiving an SAP frame from the terminal 1, for instance, to a service type 0xabc (encryption service) for sending to the network 3 through the network side transmitting/receiving section 23, converts the service type 0xabc, when receiving an SAP frame from the network 3, to a service type 0x04, sets the number of Hops to 0x10 when it is a service type 0x04 for sending to the terminal side 1 through the terminal side transmitting/receiving section 21.

A data section (X11 in FIG. 2) of other data frame is encrypted/decrypted in the data encrypting/decrypting section 27. The network side transmitting/receiving section 23 sends the frames each processed respectively to the network 3. The section 21 also sends the received frame from the terminal side transmitting/receiving section 21 to a terminal other than the terminal to which the frame has been transmitted as it is. The section 23 also processes the frame received from the network side transmitting/receiving section 23 in the same way as described above for sending the frame from the terminal side transmitting/receiving section 21 to the terminal side 1.

Figure 6:
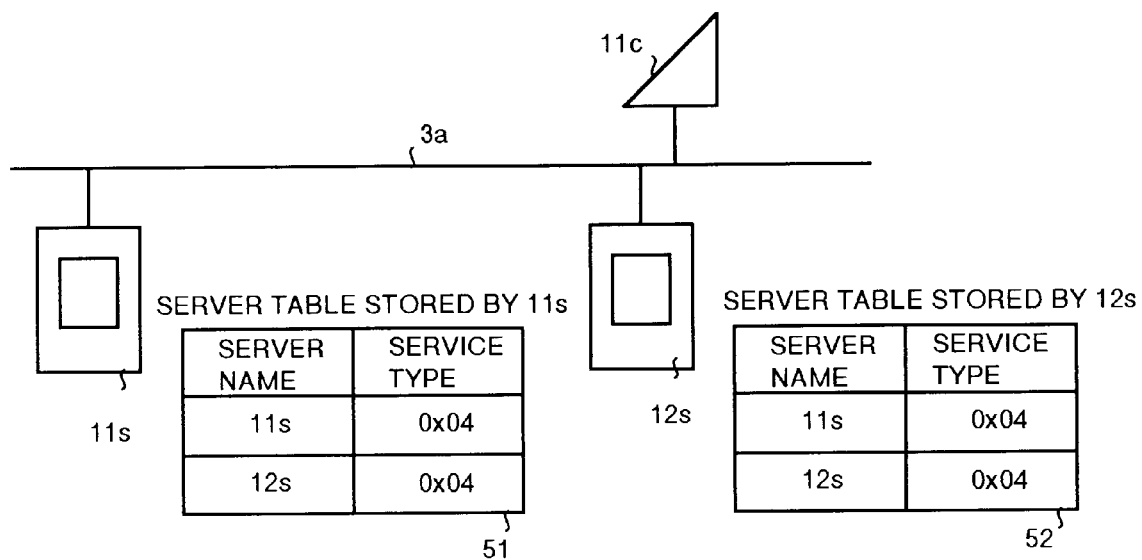
FIG. 6 is a view showing configuration of a network in a case where a client and a server on the same network communicate with each other without encrypting data.

Next, FIG. 6 shows an example of network configuration for when a client/server on the same network executes communication without encrypting. In FIG. 6, reference numeral 3a designates a network, 11s, 12s designate a server, and 11c designates a client.

Reference numeral 51 designates a server table which the server 11s stores therein, 52 designates a server table which the server 12s stores. Each of the server tables stores server information such as a server name and a server type or the like.

Figure 7:
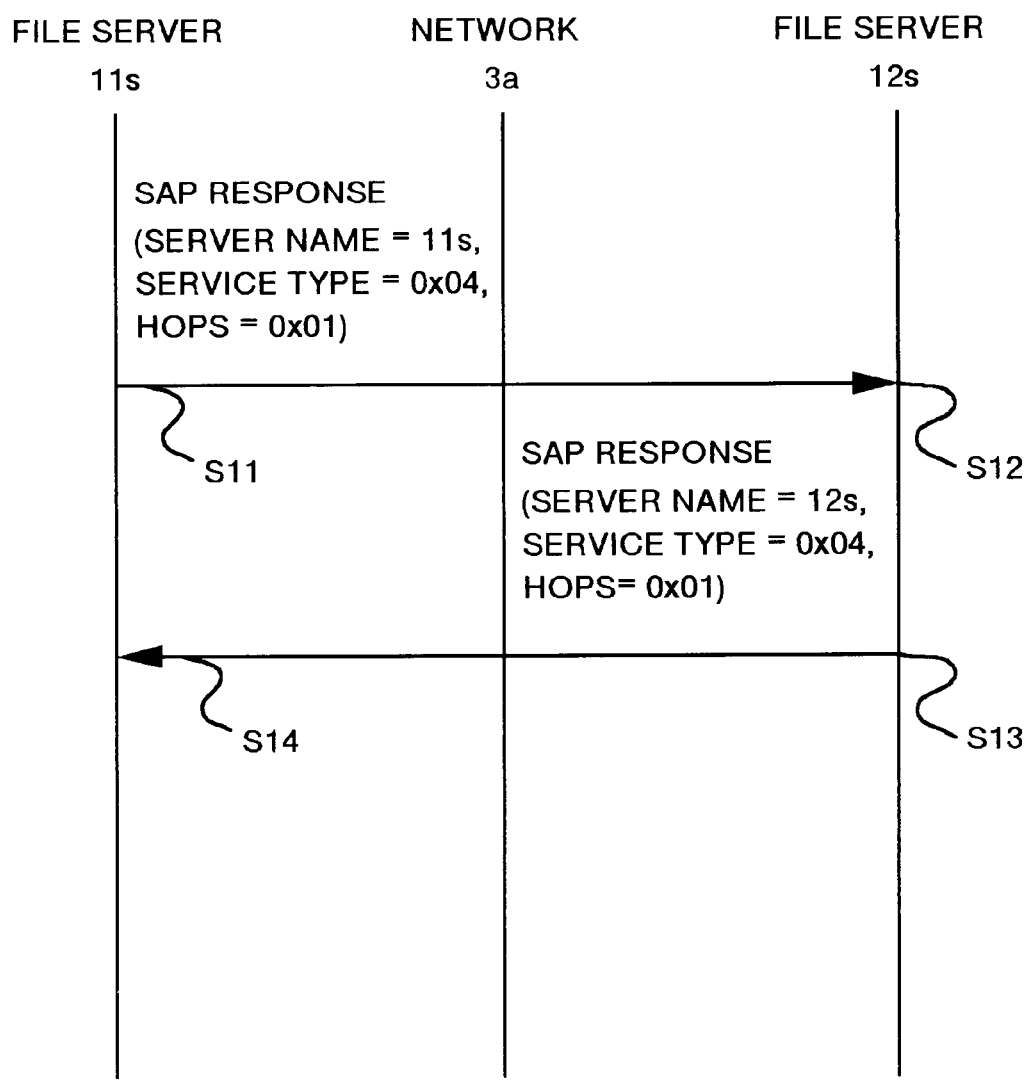
FIG. 7 is a sequence diagram showing a case where a server periodically transmits its server information.

FIG. 7 shows a sequence in which the server periodically sends its own server information. In the figure, the file server 11s periodically broadcasts its own server information (the server name 11s, service type 0x04) on the network 3a using the SAP frame (step S11). The file server 12s having received the SAP frame from the network 3a sets the server name 11s and the service type 0x04 each included in the SAP frame in the server table 52 (step S12).

The file server 12s periodically broadcasts its own server information (the server name 12s, service type 0x04) on the network 3a using the SAP frame (step S13). The file server 11s having received the SAP frame from the network 3a sets the server name 12s and the service type 0x04 each included in the SAP frame in the server table 51 (step S14).

Figure 8:
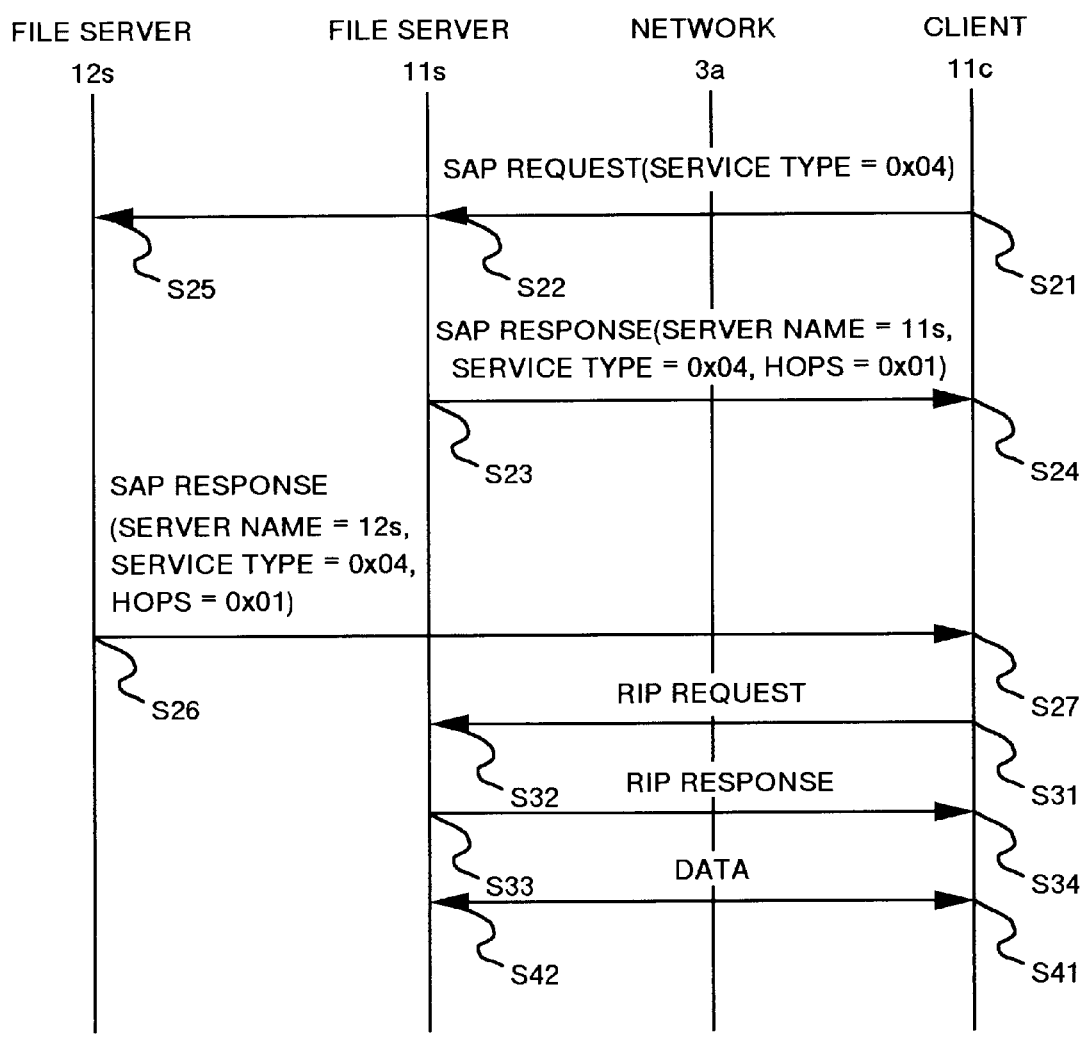
FIG. 8 is a sequence diagram when a client is initialized.

Next, FIG. 8 shows a sequence when the client 11c starts its operation. In the figure, the client 11c sends an SAP request frame of nearest Service Query which is a service type 0x04 when starting its operation to the network 3a (step S21).

The server 11s sends, when having received the SAP request of the service type 0x04 from the network 3a (step S22) and as the received service type is identical to that in the server 11s, an SAP response frame in its own server information (the server name 11s, service type 0x04) to the client 11c (step S23). The client 11c at first sends, when having received the response frame from the file server 11s (step S24), an RIP request frame thereto to obtain the routing information for the server 1 s set in the response frame (step S31).

When having received the RIP request frame. (step S32), the server 11s sends a response to the client (step S33).

When the client 11c receives the RIP response frame (step S34), data frames are transmitted/received between the client 11c and the server 11s thereafter (steps S41, S42).

It should be noted that the file server 12s receives the request frame from the network 3a (step S25), the server 12s providing a service identical to that received sends an SAP response frame in its own server information (the server name 12s, service type 0x04) (step S26), and then the client 11c ignores the response frame received after this operation (step S27).

As described above, the server 12s also receives the SAP request frame transmitted in step S21 of FIG. 8 to broadcast and sends the response. The client starts data communication according to the response frame received at first in a case where it receives a plurality of SAP responses.

For instance, in a case where the client 11c connected to the server 11s wants to also execute data communication with the server 12s, the client 11c sends an RIP request to obtain address information for the server 12s from the server 11s connected thereto, obtains the address information from the RIP response, then starts communication with the server 12s.

It should be noted that, when the address information for the server 12s cannot be obtained from the server 11s, the client 11c cannot execute communication therewith.

Figure 9:
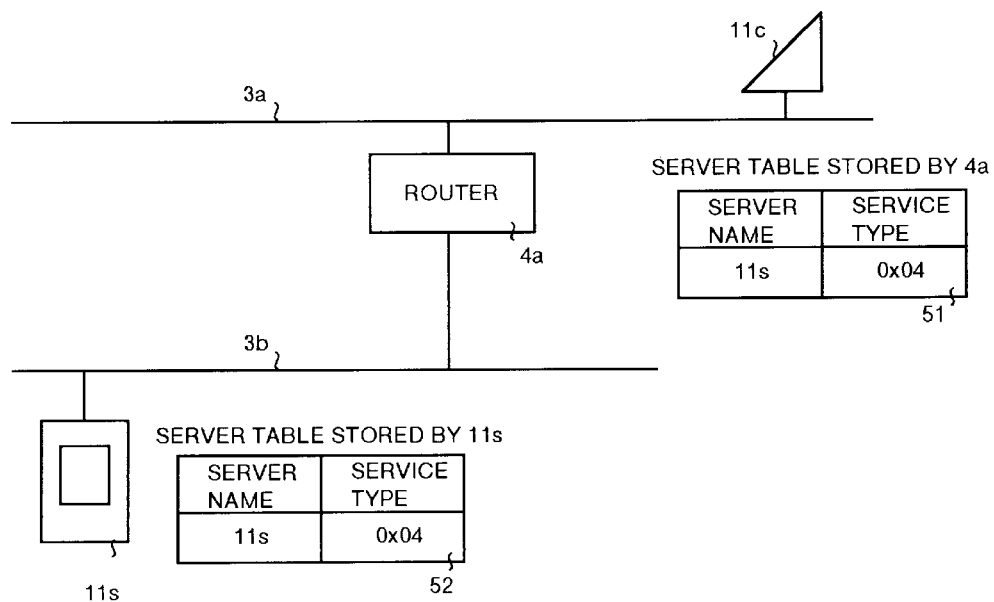
FIG. 9 is a view showing configuration of a client and a server connected through a router.

FIG. 9 shows an example of a network configuration for when a client and a server, each in a different network, communicate via a router without encrypting information. In the figure, reference numeral 3a, 3b designate a network, 4a designates a router, 11s designates a server, 11c designates a client, 51 designates a server table stored by the router 4a, and 52 designates a server table stored by the server 11s.

Figure 10:
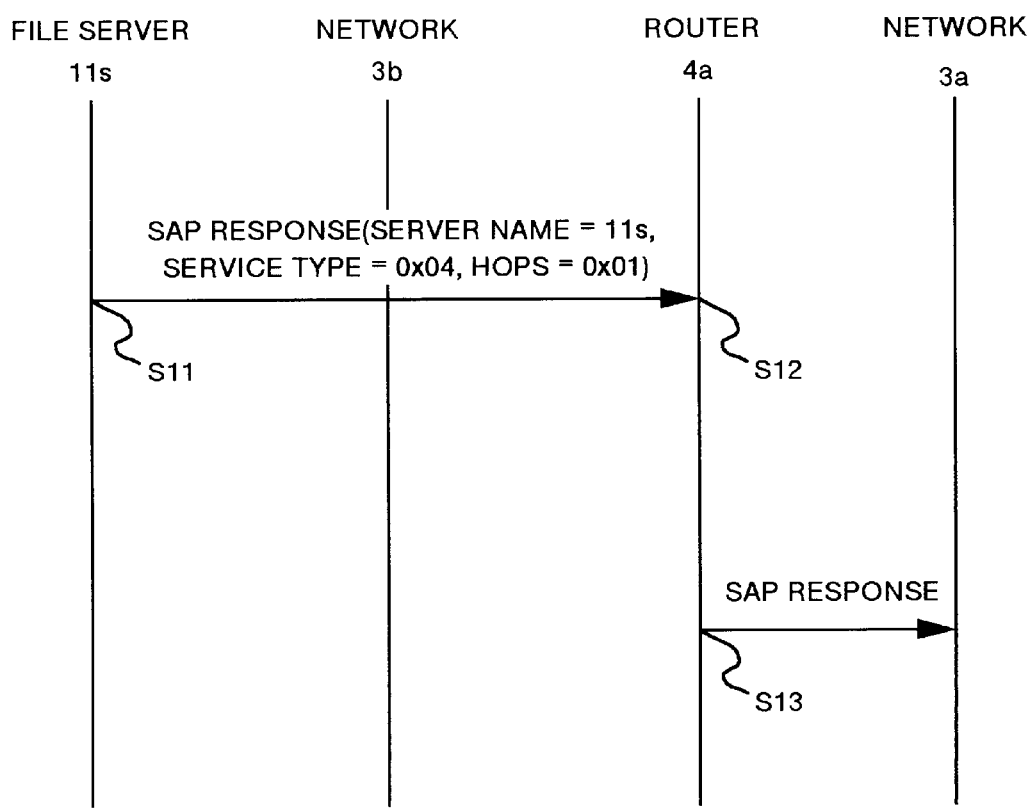
FIG. 10 is a sequence diagram showing a case where a server periodically transmits its server information.

FIG. 10 shows a sequence in which the server 11s periodically sends a response frame which includes its server information to the network 3b. In FIG. 10, the file server 11s periodically broadcasts its server information on the network 3b using the SAP frame (step S11). The router 4a, having received server information (step S12), registers it in its server table 51, and periodically sends the information to another network 3a (step S13).

Figure 11:
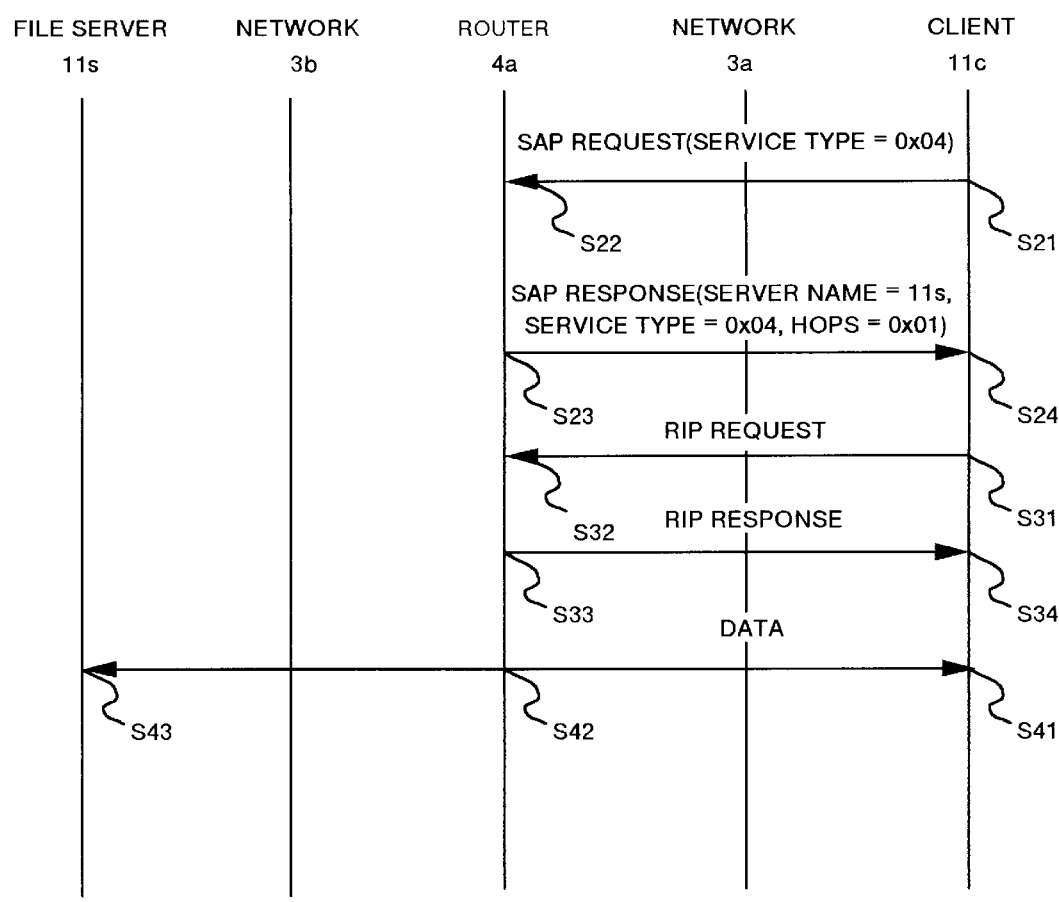
FIG. 11 is a sequence diagram for when a client is initialized.

FIG. 11 shows a sequence for when the client 11c starts its operation. In the figure, the client 11c sends an SAP request frame of Nearest Service Query which is a service type 0x04 to the network 3a (step S21). The router 4a, having received the SAP request of Nearest Service Query from the network 3a (step S22), refers to the server table 51, and sends the response frame in which the file server information for the server name 11s with the smallest number of Hops in the request service type (0x04) is set, to the client 11c (step S23). The client 11c sends an RIP request frame thereto (step S31) to obtain the routing information for the server 11s set in the received response frame (step S24). The router having received the RIP request frame (step S32) sends the response to the client (step S33). The client 11c starts communications (steps S41, S42, S43) according to the received RIP response frame (step S34).

Figure 12:
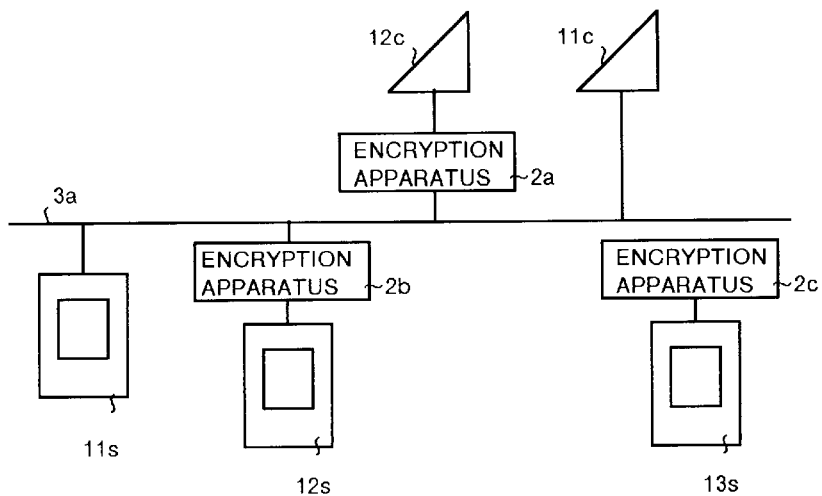
FIG. 12 is a view showing a cryptocommunication system configuration according to Embodiment 1.

FIG. 12 shows a block diagram of a network system in which a server/client having an encryption system and a server/client having a non-encryption system exist on the same network. In FIG. 12, reference numeral 2a, 2b, 2c designate an encryption apparatus respectively, 3a designates a network, 11c designates a client with a non-encryption system which is not connected to an encryption apparatus, 12c designates a client with an encryption system which is connected to an encryption apparatus, 11s designates a server with a non-encryption system which is not connected to an encryption apparatus, 12s, 13s, designate a server with an encryption system which is connected to an encryption apparatus respectively. Also, reference numeral 52 designates a server table stored by the server 11s, 53 designates a server table stored by the server 12s, 54 designates a server table stored by the server 13s, and server information such as a server name, a service type, and the number of Hops or the like is stored in each of the server tables.

Figure 13:
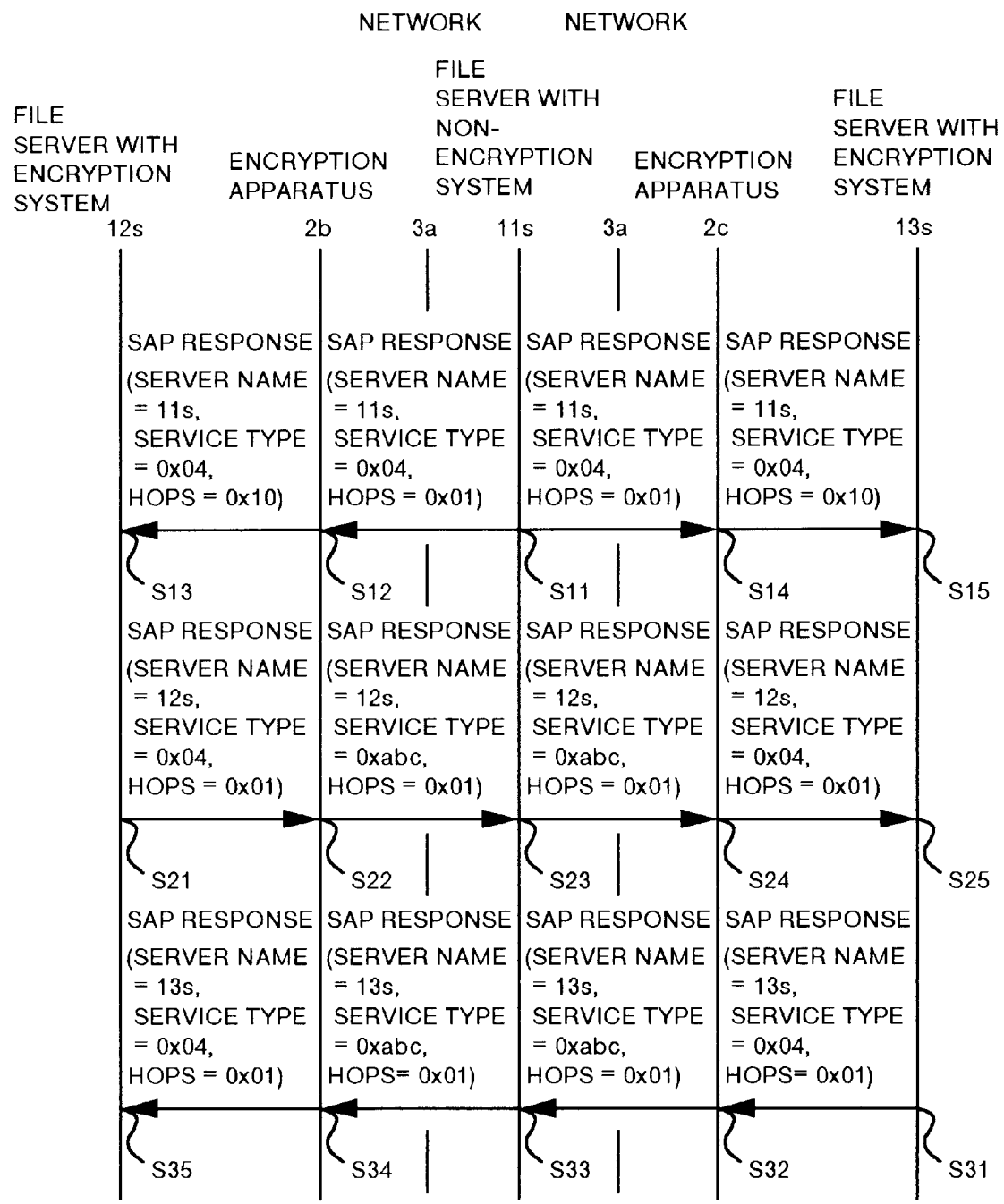
FIG. 13 is a sequence diagram showing a case where a server periodically transmits its server information in a cryptocommunication system according to Embodiment 1.

FIG. 13 shows a sequence in which, in the network configuration shown in FIG. 12, the server 11s with a non-encryption system and the servers 12s, 13s, each with an encryption system, periodically broadcast their server information on the network 3a, and each server receives server information from other servers to update their server table.

In FIG. 13, the server 11s with a non-encryption system broadcasts server information with the server name 11s in the server type 0x04 to the servers on the network 3a (step S11).

The encryption apparatus 2b sets, when having received server information for the server 11s from the network 3a, the number of Hops to 0x10 (a value indicating the fact that the server 11s is unusable) for sending the information to the server 12s (step S12). The server 12s, having received the server information for the server 12s from the encryption apparatus 2b and found that the number of Hops of the server information is 0x10, aborts the server information, and does not write the server information for the server 11s in the server table 53 (step S13).

Similarly, the encryption apparatus 2c sets, having received server information for the server 11s from the network 3a and found that the service type is 0x04, the number of Hops to 0x10 for sending the information to the server 13s (step S14). The server 13s, having received the server information for the server 11s from the encryption apparatus 2c and found that the number of Hops of the server information is 0x10, aborts the server information, and does not write the server information for the server Its in the server table 54 (step S15).

Next the server 12s broadcasts server information such as the server name 12s and the service type 0x04 (step S21). The encryption apparatus 2b changes the service type to the service type 0xabc indicating a server with an encryption system for sending such information to the network 3a (step S22). The server 11s, having received the information for the server 12s from the network 3a, registers the server name 12s as well as the service type 0xabc in the server table 52 (step S23).

Furthermore, the encryption apparatus 2c changes, having received server information for the server 12s from the network 3a, the service type 0xabc of the received server information to the type 0x04 for outputting such information to the server 13s (step S24). The server 13s registers, having received the server information for the server 12s from the encryption apparatus 2c, the server name 12s as well as the service type 0x04 in the server table 54 (step S25).

Next, the server 13s sends server information such as the server name 13s and the service type 0x04 to the encryption apparatus 2c (step S31). The encryption apparatus 2c converts the service type to the service type 0xabc indicating the server with an encryption system for sending such information to the network 3a (step S32). The server 11s with a non-encryption system, having received the server information for the server 13s from the network 3a, registers the server name 13s as well as the service type 0xabc in the server table 51 (step S33). The encryption apparatus 2b converts, when having received the server information for the server 13s from the network 3a, the service type 0xabc of the received server information to the type 0x04 for sending such information to the server 12s (step S34). The server 12s registers, having received the server information for the server 13s from the encryption apparatus 2b, the server name as well as the service type 0x04 in the server table 53 (step S35).

As described above, each of the servers periodically updates information for other servers.

Figure 14:
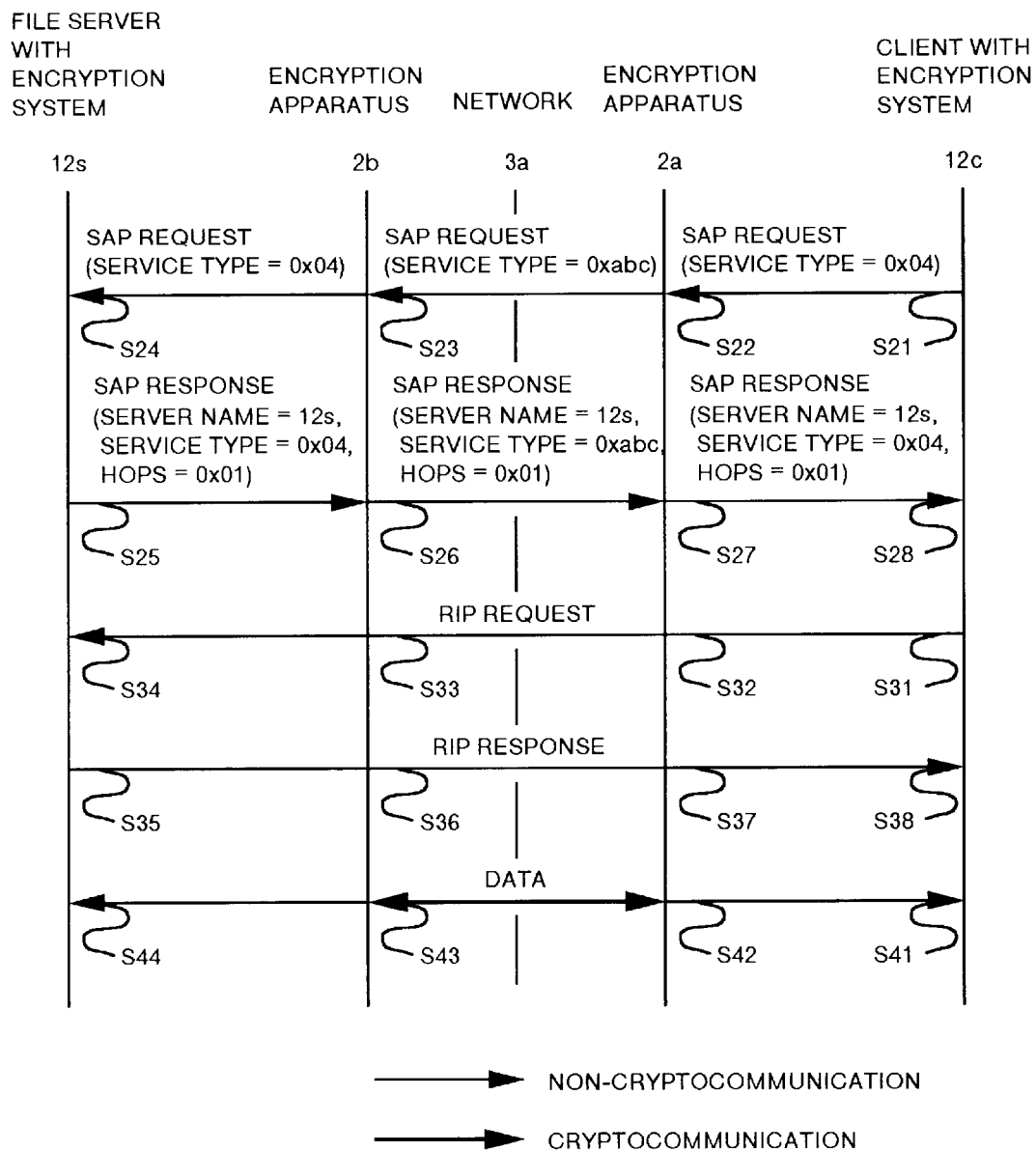
FIG. 14 is a sequence diagram for when a client is initialized in a cryptocommunication system according to Embodiment 1.

Referring to FIG. 14, a processing sequence is described for the client 12c from initialization until starting communications with the server 12s in the system shown in FIG. 12.

The client 12c sends an SAP request frame of Nearest Service Query which is a service type 0x04 to the encryption apparatus 2a (step S21). The encryption apparatus 2a changes, having received the SAP request frame of Nearest Service Query which is a service type 0x04 therefrom, the service type 0x04 to the service type 0xabc for sending such information to the network 3a (step S22). The server 11s (with a non-encryption system) aborts the request because the service type thereof is different from the service type of the server 11s (not shown herein). The encryption apparatus 2b changes, having received the SAP request frame of Nearest Service Query which is a service type 0xabc from the network 3a, the service type thereof to the service type 0x04 for sending such information to the server 12s (with an encryption system) (step S23).

Having received the SAP request of Nearest Service Query which is a service type 0x04 (step S24), the server 12s sends its server information of the service type 0x04 with the server name 12s as a response because the received service type is the same as its own service type (step S25). The encryption apparatus 2b changes, having the response of the service type 0x04 with the server name 12s, the service type thereof to the service type 0xabc for sending such information to the network 3a (step S26). The encryption apparatus 2a changes, having received the response of the service type 0xabc from the network 3a, the service type thereof to the service type 0x04 for sending such information to the client 12c (with an encryption system) (step S27). The client 12c sends an RIP request frame to the encryption apparatus 2c (step S31) to obtain the address of the received server (step S28). The encryption apparatus 2a sends the received RIP request as it is to the network 3a (step S32).

The encryption apparatus 2b sends the RIP request received from the network 3a as it is to the server 12s (step S33). The server 12s sends, having received the RIP request (step S34), the RIP response to the encryption apparatus 2b (step S35). The encryption apparatus 2b sends the received RIP response as it is to the network 3a (step S36). The encryption apparatus 2a sends the received RIP response from the network 3a as it is to the client 12c with an encryption system (step S37). The client 12c starts data frame transactions with the server 12s according to the received RIP response (step S38). Specifically, the client 12c sends a data frame to the server 12s (step S41). The encryption apparatus 2a encrypts the data section X11 in the received data frame for sending to the network 3a (step S42). The encryption apparatus 2b encodes the data section X11 in the received data frame for sending to the server 12s (step S43), and the server 12s receives the data frame (step S44).

Data is sent from the server 12s to the client 12c by executing a sequence from step S41 to step S44 in reverse order.

Figure 15:
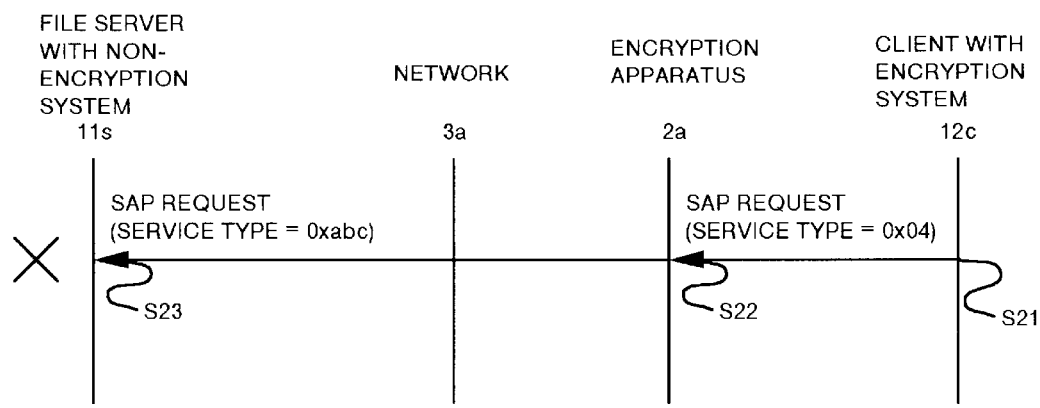
FIG. 15 is a sequence diagram showing a case where a server with a non-encryption system receives a SAP request from a client with an encryption system in the cryptocommunication system according to Embodiment 1.

FIG. 15 shows a sequence for when the server 11s (with a non-encryption system) receives the SAP request sent by the client 12c when it is initialized in the system shown in FIG. 12. In FIG. 15, when the client 12c sends an SAP request frame of Nearest Service Query which is a service type 0x04 when it is initialized (step S21), the encryption apparatus 2a changes the received service type to the service type 0xabc for sending such information to the network 3a (step S22). The server 11s aborts the request when receiving the SAP request frame of Nearest Service Query which is a service type 0xabc from the network 3a because the received service type is different from its own service type 0x04 (step S23).

Figure 16:
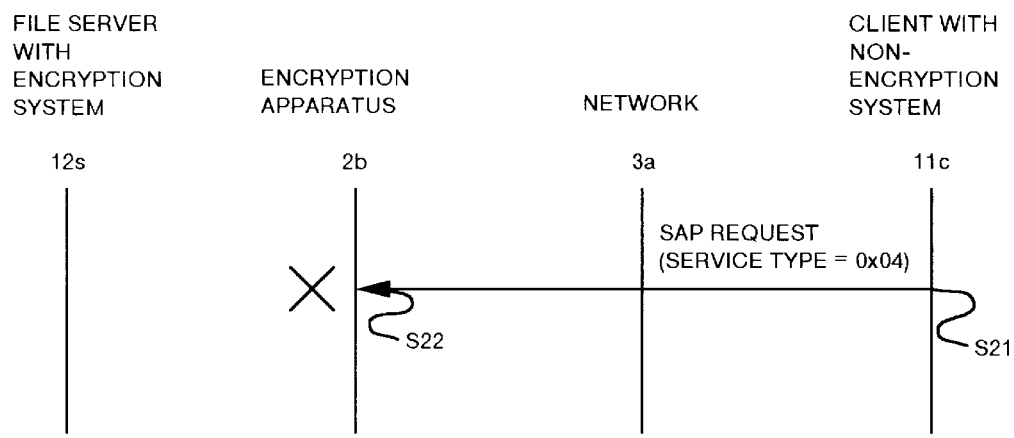
FIG. 16 is a sequence diagram showing a case where a server with an encryption system receives a SAP request from a client without an encryption system in the cryptocommunication system according to Embodiment 1.

Alternatively, FIG. 16 shows a sequence for a case in which the encryption apparatus 2b accommodating the server 12s (with an encryption system) receives the SAP request sent by the client 11c (with a non-encryption system) when initialized. In FIG. 16, when the client 11c sends an SAP request frame of Nearest Service Query which is a service type 0x04 when initialized (step S21), the encryption apparatus 2b, having received this SAP request frame, aborts the request because the service type of the received frame is different from its own type (step S22).

Accordingly, any of the clients with a non-encryption system can not be connected to any of the servers with an encryption system. Likewise, any of the clients with an encryption system cannot be connected to any of the servers with a non-encryption system.

Figure 17:
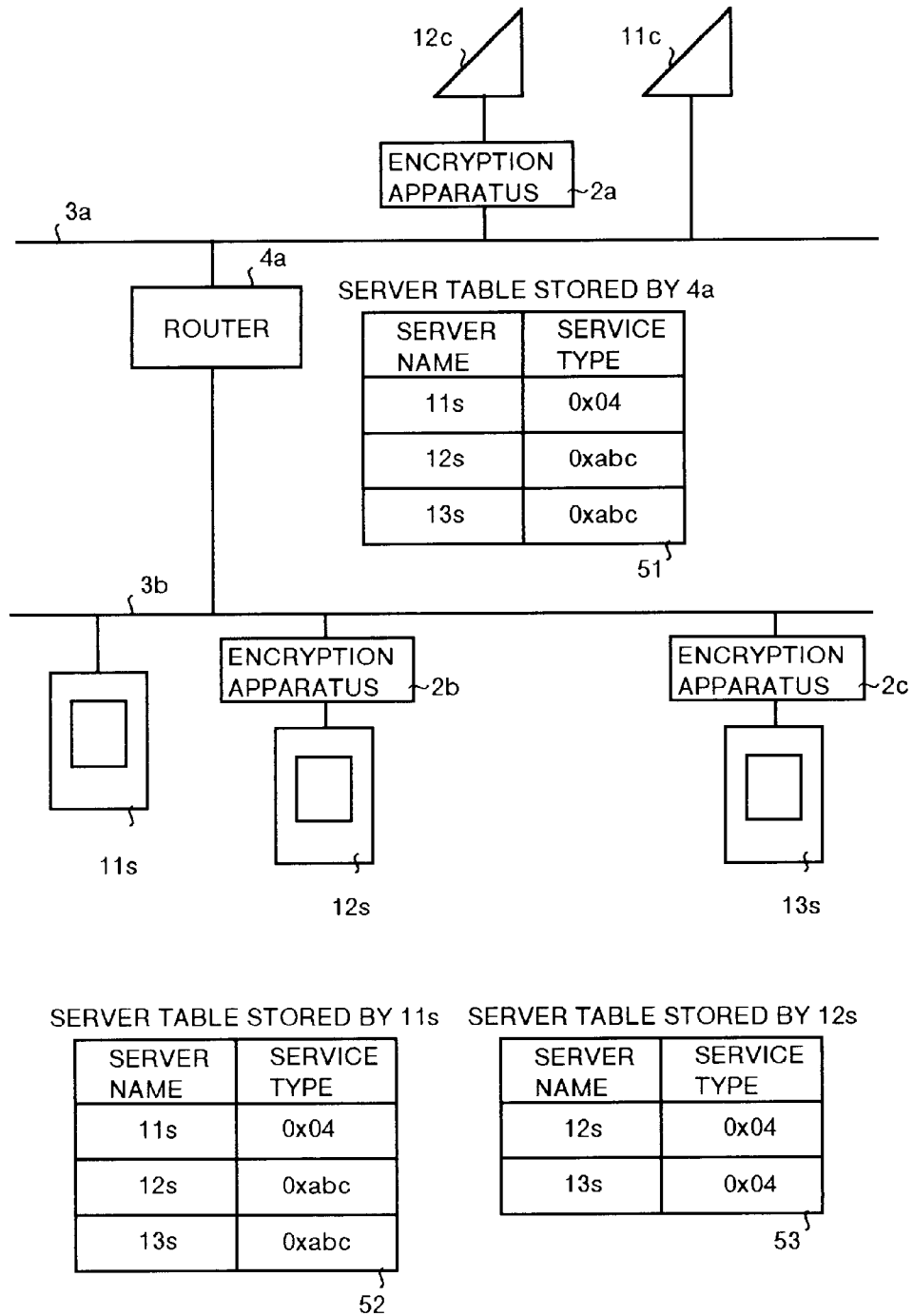
FIG. 17 is a view showing configuration of a cryptocommunication system including a router according to Embodiment 1.

FIG. 17 shows a block diagram of a network system in which a server with an encryption system as well as a server with a non-encryption system exist on the same network, and a client with an encryption system as well as a client with a non-encryption system exist on different networks connected through a router.

In FIG. 17, reference numeral 3a, 3b designate a network, 4a designates a router, 2a, 2b, 2c designate an encryption apparatus respectively, 11s designates a server with a non-encryption system, 12s, 13s designate a server with an encryption system, 12c designates a client with an encryption system, 11c designates a client with an encryption system, 51 designates a server table stored by the router 4a, 52 designates a server table stored by the server 11s, and 53 designates a server table stored by the server 12s. It should be noted that a description of the server table stored by the server 13s is omitted herein.

Like the example in FIG. 12, the server 11s (with a non-encryption system) and servers 12s, 13s (each with an encryption system) periodically broadcast their server information to the servers on the network using SAP frames, and the server 11s and servers 12s, 13s learn server information from the received SAP frames respectively (which is indicated by the reference numerals 52 and 53 shown in FIG. 17).

The router 4a registers the server information in the server table 51 according to the SAP frames of the server 11s and servers 12s, 13s received from the network 3b. Specifically, the server name 11s and the service type 0x04 are registered therein according to the SAP frame of the server 11s, the server name 12s and the service type 0xabc are registered therein according to the SAP frame of the server 12s, and the server name 13s and the service type 0xabc are registered therein according to the SAP frame of the server 13s.

Figure 18:
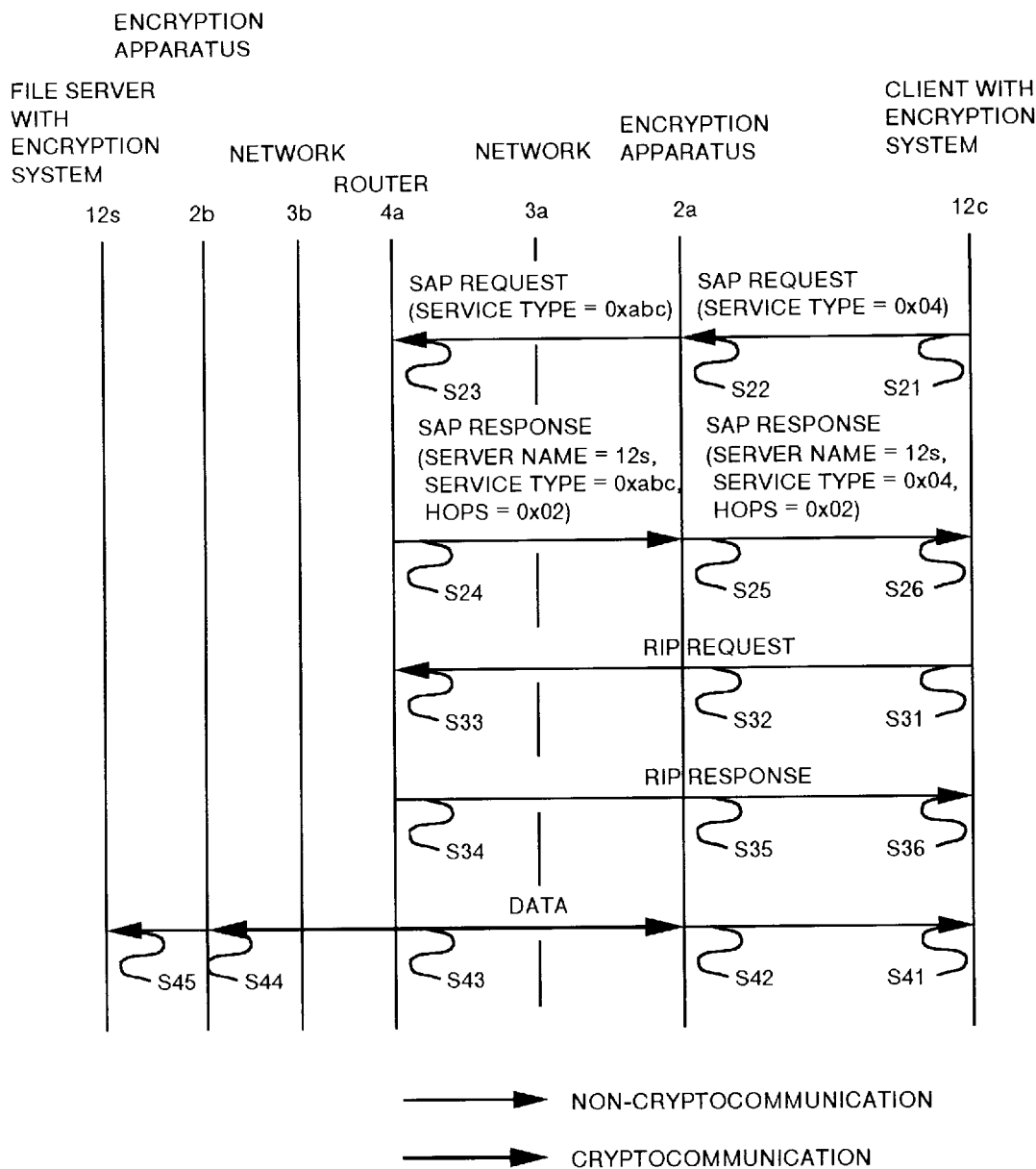
FIG. 18 is a sequence diagram when a client is initialized in a cryptocommunication system including the router according to Embodiment 1.

FIG. 18 shows a sequence of processing for the client 12c (with an encryption system) from initialization until starting communication with the server 12s (having an encryption system.)

In the figure, the client 12c sends an SAP request frame of Nearest Service Query which is a service type 0x04 when initialized (step S21). The encryption apparatus 2a changes, having received the SAP request of the service type 0x04 from the client side, the received service type to the service type 0xabc for sending such information to the network 3a (step S22).

The router 4a, having received the SAP request of the service type 0xabc (step S23), refers to the server table 51, obtains the server name 12s with the smallest number of Hops and the same service type 0xabc as that of the SAP request for sending the information for the server 12S as the SAP response (step S24) to the network. The encryption apparatus 2a changes, having received the server information of the service type 0xabc from the network side, the received service type to the service type 0x04 for sending such information to the client 12c (step S25), and the client 12c receives the information (step S26). The client 12c sends an RIP request frame to the encryption apparatus 2a (step S31) to obtain the address of the received server 12s. The encryption apparatus 2a sends the received RIP frame to the network 3a as it is (step S32).

The router 4a receives the RIP request from the encryption apparatus 2a through the network 3a (step S33), and sends the response to the network 3a (step S34). The encryption apparatus 2a sends the RIP response from the network 3a to the client 12c as it is (step S35), and the client 12c receives the RIP response (step S36). The client 12c starts communicating with the server with an encryption system (step S41). Specifically, the encryption apparatus 2a sends the data section X11 in the data frame by encrypting (step S42) to the router 4a. The router 4a sends the frame to the receiver's address according to the routing table (step S43). The encryption apparatus 2b decrypts the data section X11 in the received data frame for sending to the server with an encryption system (step S44), and the server with an encryption system receives the decrypted data frame (step S45).

Data is sent from the server 12s to the client 12c by processing the data from step S41 to step S45 in the reverse order.

The client 12c can not access the server 11s because the server 12s does not store the information for the server 11s in its server table 53.

As described above, by not encrypting RIP/SAP frames, dividing the service type of a server into an encryption system and a non-encryption system, and encrypting other data frames, it is possible to execute cryptocommunication through a network in which clients/servers with an encryption system and clients/servers with a non-encryption system are mixed.

Figure 19:
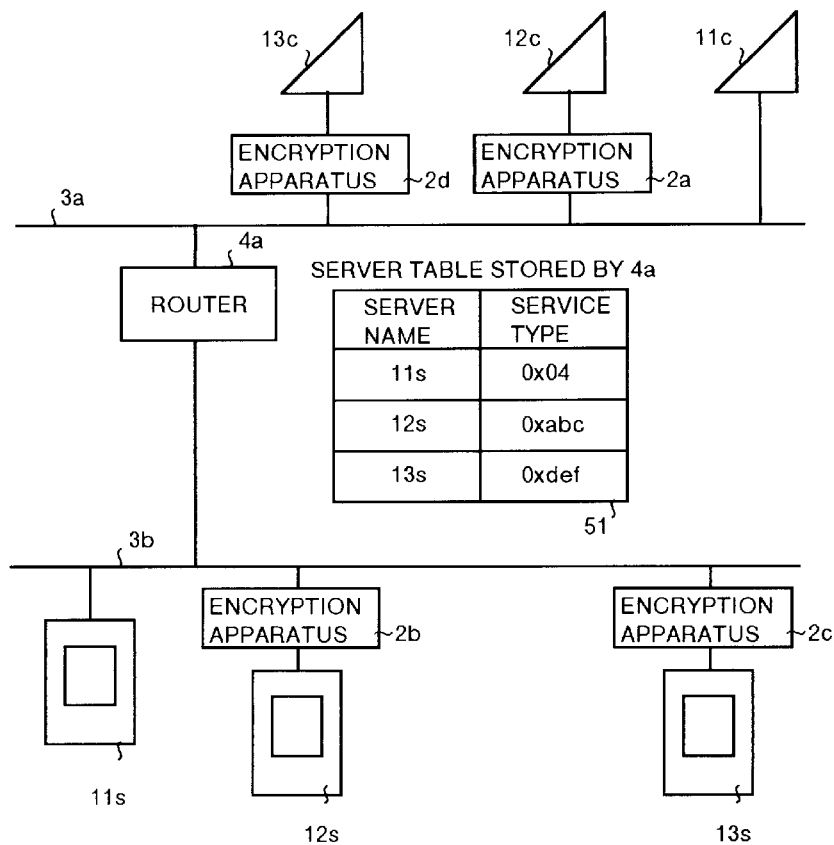
FIG. 19 is a view showing configuration of a cryptocommunication system including a router in a case where a plurality types of encryption service are provided.

Further, it is possible to construct a closed group with an encryption by using a plurality of values allocated thereto as a service type of the server with an encryption system on the same network. FIG. 19 shows a system configuration. In FIG. 19, numeral 11c designates a client with a non-encryption system, 12c, 13c designate a client with an encryption system respectively, 11s designates a file server with a non-encryption system, and 12s, 13s designate a file server with an encryption system respectively. A service type 0xabc is set in each of the encryption apparatuses 2a, 2b as a service type for conversion, and 0xdef is set in each of encryption apparatuses 2c, 2d, whereby the client and server each having the same service type can communicate with each other. Accordingly, if the service types with an encryption system correspond to encryption keys, a plurality of encrypted groups can be constructed.

In the above embodiment, an example of applying the present invention to NetWare is described. The same effect, however, can be achieved in other protocols in which routing information is exchanged between a server and a client to relay frames, the client is connected to the server by exchanging server information, and the client connection is periodically checked between the server and the client.

Although an encryption system and a non-encryption system are discriminated in the service type according to Embodiment 1, in this embodiment, a client connected to the encryption apparatus and a server with a non-encryption system can be connected to each other by providing a transparent processing address table. The transparent processing address table specifies whether or not encrypting/encoding is to be executed in correspondence with a receiver's server in the encryption apparatus accommodating clients in addition to the service types provided therein. A transparent processing server table stores servers having a non-encryption system in the encryption apparatus accommodating servers.

In NetWare, a client is connected to a server when initialized, establishes connection with a plurality of servers using the server described above as a base server, and executes communication therewith. When the client is to establish connection with another server, the client specifies a server name to obtain address information (a network number SP6 and a node number SP7 in FIG. 5) for a server at a destination for connecting from the base server. The client sends an RIP request for the network number SP6 to the base server after receiving the address information. The client establishes connection with the server after receiving the RIP response. If the base server does not store the address information for the server at a destination for the connection, the client can not establish connection therewith. In this embodiment, non-cryptocommunications can be executed between a client with an encryption apparatus and a server without an encryption apparatus by setting information indicating whether or not encrypting/decrypting is to be executed in the encryption apparatus according to a receiver's address.

Figure 20:
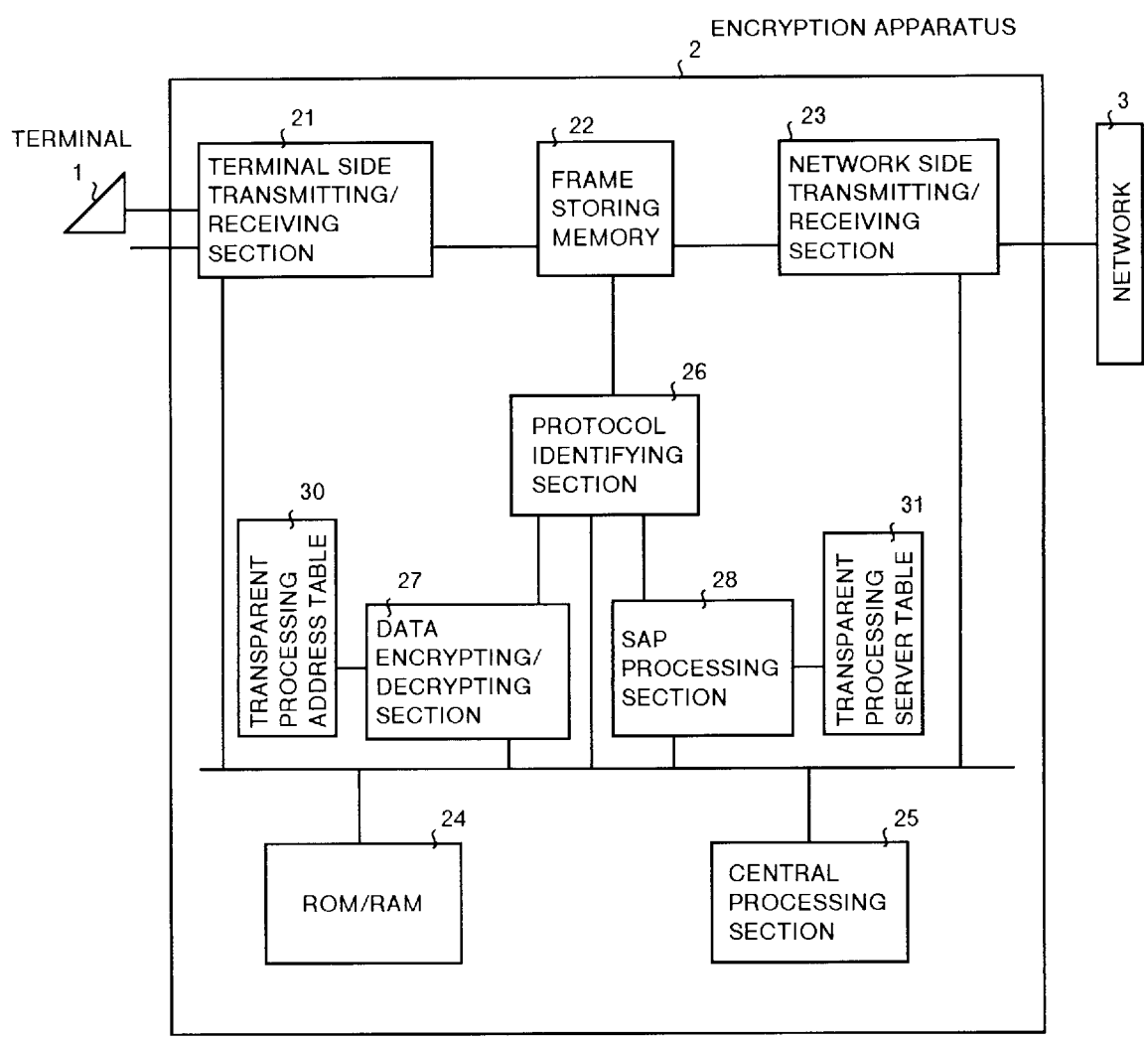
FIG. 20 is a view showing an encryption apparatus configuration according to Embodiment 2 of the present invention.

FIG. 20 shows a configuration of the encryption apparatus according to this embodiment of the present invention. In FIG. 20, reference numeral 30 indicates a transparent processing address table, and reference numeral 31 indicates a transparent processing server table. Reference numeral 27 indicates a data encrypting/decrypting section. The section does not encrypt/decrypt data if the address of a receiver's server included in the data frame is registered in the transparent processing address table 30, and encrypts/decrypts the data if the address is not registered therein.

The reference numeral 28 indicates an SAP processing section, which sends the SAP frame as it is if the server having server information included in the SAP frame received from a network side is registered in the transparent processing server table 31, and aborts the SAP frame if it is not registered therein.

The reference numerals 1 to 3 and 21 to 26 in FIG. 20 are the same as those in Embodiment 1 (FIG. 1), and thus a description thereof is omitted herein.

Figure 21:
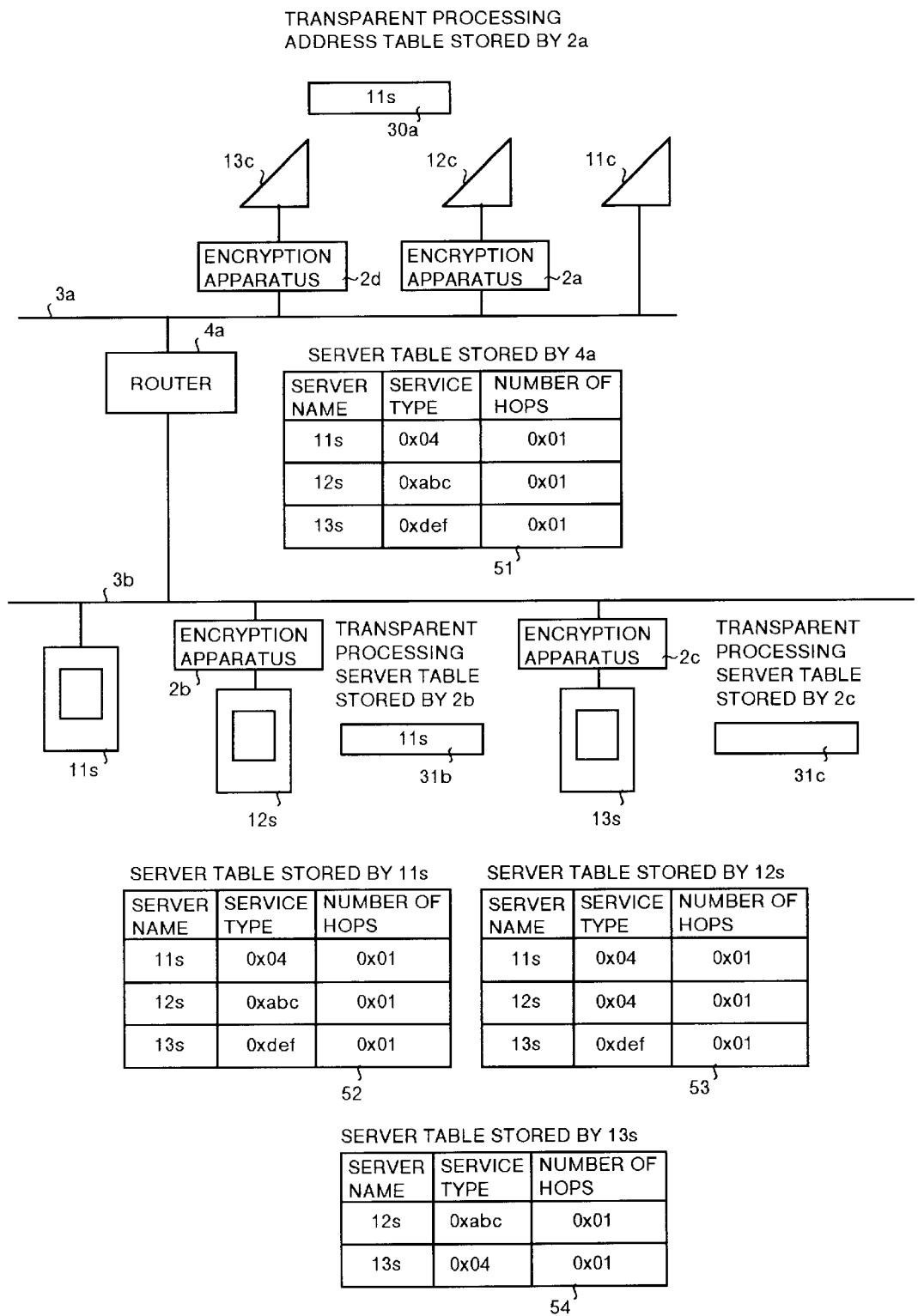
FIG. 21 is a view showing configuration of a cryptocommunication system including a router according to Embodiment 2.

FIG. 21 shows a communication system configuration. In the figure, reference numeral 30a indicates a transparent processing address table (the reference numeral 30 in FIG. 20), which stores addresses for receiver's servers, and the table is stored by the encryption apparatus 2a which accommodates clients. In this example, the address for receiver's server 11s is stored in the transparent processing address table 30a, meaning that the encryption apparatus 2a does not encrypt/encode the frame addressed to the server 11s.

The reference numeral 31b indicates a transparent processing server table (the reference numeral 31 in FIG. 20), which stores the names of servers. The table is stored in the encryption apparatus 2b. In this example, the encryption apparatus 2b stores the server name 11s in the transparent processing server table 31b thereof. The fact that the server name 11s is registered in the transparent processing server table 31b means that the encryption apparatus 2a executes transparent processing to the data without changing the service type of the SAP response frame from the server 11s to any type, and also without changing the number of Hops. As the encryption apparatus 2c has no server for executing transparent processing, the names of servers are not stored in a transparent processing server table 31c. It should be noted that the reference numeral 11s indicates a server for non-encryption, the reference numeral 12s indicates a server for encryption with the service type 0×abc, and the reference numeral 13s indicates a server for encryption with the service type 0×def.

Reference numerals 11c, 12c, 13c, us, 12s, 13s, 3a, 3b, 4a, 51 to 54 are the same as those in FIG. 19, and thus a description thereof is omitted herein.

Figure 22:
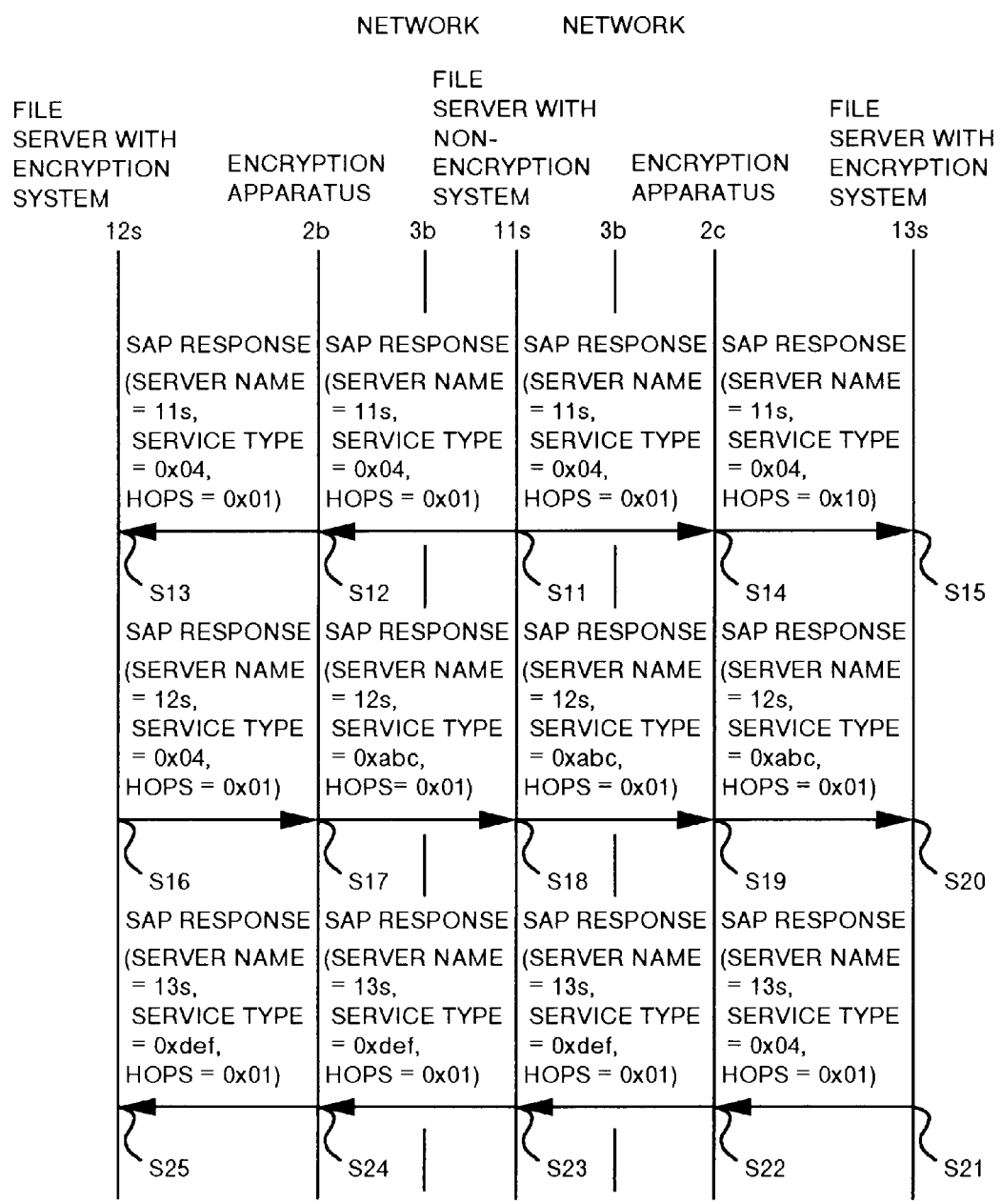
FIG. 22 is a sequence diagram showing a case where a server periodically transmits its server information in the cryptocommunication system according to Embodiment 2.

FIG. 22 shows a sequence in which each of the servers 11s, 12s, 13s periodically sends their server information to the network in the system shown in FIG. 21.

In the figure, the server 11s periodically broadcasts its server information (step S11). The encryption apparatus 2b receives information for the server 11s from the network side transmitting/receiving section, stores the information in the frame storing memory (the reference numeral 22 in FIG. 20) for transferring such information to the protocol identifying section (the reference numeral 26 in FIG. 20). The information is identified by the protocol identifying section as an SAP frame for being transferred to an SAP processing section (the reference numeral 28 in FIG. 20). The SAP processing section searches for the transparent processing server table 31b (the reference numeral 31 in FIG. 20), and finds that the server 11s is registered therein, so that the frame is sent to the terminal side transmitting/receiving section (the reference numeral 21 in FIG. 20) as it is. The server 12s receives information for the server 11s and registers the server name 11s, and the service type 0×04 in the server table 53 (step S13).

The encryption apparatus 2c receives information for the server 11s from the network side transmitting/receiving section (the reference numeral 23 in FIG. 20), and stores such information in the frame storing memory (the reference numeral 22 in FIG. 20) for transfer to the protocol identifying section (the reference numeral 26 in FIG. 20). The information is identified by the protocol identifying section as an SAP frame for transfer to the SAP processing section (the reference numeral 28 in FIG. 20). The SAP processing section searches for the transparent processing server table 31c (the reference numeral 31 in FIG. 20), and finds that the server 11s is not registered therein, so that the number of Hops is changed to 0×10 (inoperative server information), and the changed information is sent to the terminal from the terminal side transmitting/receiving section (the reference numeral 21 in FIG. 20) (step S14). The server 13s aborts the information for the server 11s because the number of Hops is 0×10 which is an invalid value (step S15).

The server 12s periodically broadcasts its own information (step S16). The encryption apparatus 2b receives information for the server 12s from the terminal side transmitting/receiving section, and stores the information in the frame storing memory (the reference numeral 22 in FIG. 20) for transfer to the protocol identifying section (the reference numeral 26 in FIG. 20). The information is identified by the protocol identifying section as an SAP frame for transfer to the SAP processing section (the reference numeral 28 in FIG. 20). The SAP processing section changes the received service type to the service type 0×abc for sending such information to the terminal side transmitting/receiving section (the reference numeral 21 in FIG. 20)(step S17). The server 11s receives information for the server 12s and registers the server name 12s and the service type 0×abc in the server table 52 (step S18).

The encryption apparatus 2c receives the information for the server 12s from the network side transmitting/receiving section (the reference numeral 23 in FIG. 20), and stores the information in the frame storing memory (the reference numeral 22 in FIG. 20) for transfer to the protocol identifying section (the reference numeral 26 in FIG. 20). The information is identified by the protocol identifying section as an SAP frame for being transferred to the SAP processing section (the reference numeral 28 in FIG. 20). The SAP processing section determines that the information is to be sent as it is, and the information is sent to the terminal from the terminal side transmitting/receiving section (the reference numeral 21 in FIG. 20) (step S19). The server 13s receives the information for the server 12s and registers the server name 12s and the service type 0×abc in the server table 54 (step S20).

The server 13s periodically broadcasts the server name 13s and the service type 0×def as its server information according to the same sequence as that of the server 12s, and the server 11s registers the information for the server 13s in the server table 52, while the server 12s registers the information in the server table 53.

Figure 23:
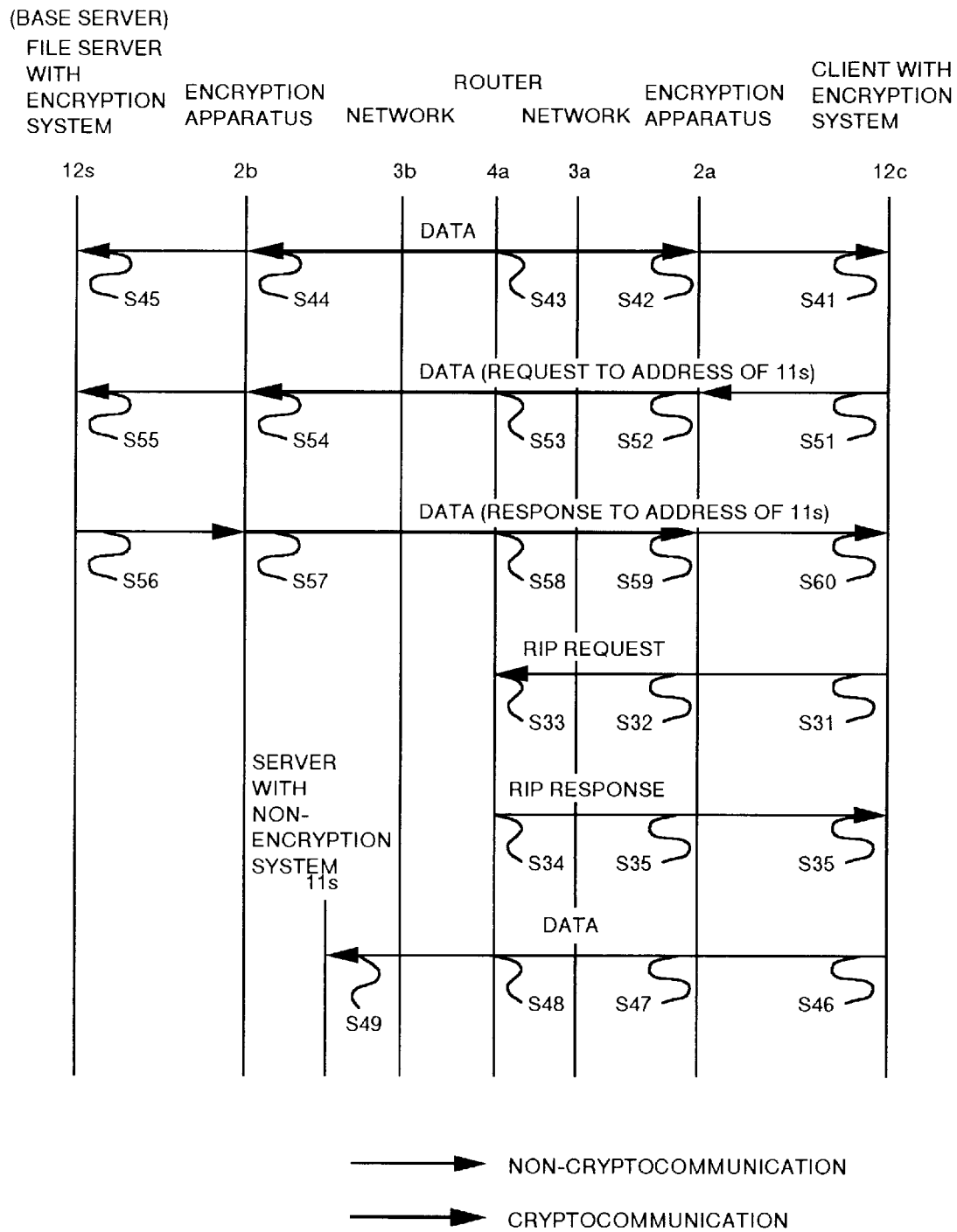
FIG. 23 is a view showing a case where a client with an encryption system is connected to a new server without an encryption system in the cryptocommunication system according to Embodiment 2.

FIG. 23 shows a sequence in which a client with an encryption system communicates with a server with a non-encryption system, with a server having an encryption system as a base server. In the figure, the client 12c (with an encryption system) executes the sequence shown in FIG. 18 (step S21) when initialized to connect to the server 12s (with an encryption system).

The client 12c sets a request for address information for the server 11s having established connection with the base server 12s in the data section X11 of the data frame for sending to the server 12s (step S51).

The encryption apparatus 2a stores the frame received from the terminal side transmitting/receiving section (the reference numeral 21 in FIG. 20) in the frame storing memory (the reference numeral 22 in FIG. 20), and the frame is identified by the protocol identifying section (the reference numeral 26 in FIG. 20) as a data frame for transfer to the data encrypting/decrypting section (the reference numeral 27 in FIG. 20). The data encrypting/decrypting section searches for the transparent processing address table 30a (the reference numeral 30 in FIG. 20), and finds that the base server 12s is not registered therein, so that the data section X11 is encrypted for being sent from the network side transmitting/receiving section (the reference numeral 23 in FIG. 20)(step S52). The router 4a relays the data frame (step S53).

The encryption apparatus 2b stores the frame received from the network side transmitting/receiving section (the reference numeral 23 in FIG. 20) in the frame storing memory (the reference numeral 22 in FIG. 20), and the frame is identified by the protocol identifying section (the reference numeral 26 in FIG. 20) as a data frame for transfer to the data encrypting/decrypting section (the reference numeral 27 in FIG. 20). The data encrypting/decrypting section decrypts the data section X11 (because the encryption apparatus accommodating servers does not have the transparent processing address table 30) for sending to the terminal from the terminal side transmitting/receiving section (the reference numeral 21 in FIG. 20) (step S54). The base server 12s searches for, having received the request for the address of the server 11s (step S5 5), its server table 53, and obtains the stored server information for the server 11s to send the address response of the server 11s to the apparatus 2b (step S56).

The encryption apparatus 2b stores the frame received from the terminal side transmitting/receiving section (the reference numeral 21 in FIG. 20) in the frame storing memory (the reference numeral 22 in FIG. 20), and the frame is identified by the protocol identifying section (the reference numeral 26 in FIG. 20) as a data frame for transfer to the data encrypting/decrypting section (the reference numeral 27 in FIG. 20). The data encrypting/decrypting section encrypts the data section X11 (because the encryption apparatus accommodating servers does not have the transparent processing address table 30) for sending to the terminal from the terminal side transmitting/receiving section (the reference numeral 21 in FIG. 20) (step S57).

The router 4a relays the received data frame (step S58). The encryption apparatus 2a stores the frame received from the network side transmitting/receiving section (the reference numeral 23 in FIG. 20) in the frame storing memory (the reference numeral 22 in FIG. 20), and the frame is identified by the protocol identifying section (the reference numeral 26 in FIG. 20) as a data frame for transfer to the data encrypting/decrypting section (the reference numeral 27 in FIG. 20). The data encrypting/decrypting section searches for the transparent processing address table 30a (the reference numeral 30 in FIG. 20), and finds that the server 12s is not registered, so that the data section X11 is decrypted for being sent to the terminal from the terminal side transmitting/receiving section (the reference numeral 21 in FIG. 20) (step S59). The client 12c receives the information for the server 11s and sends an RIP request for the address of the server 11s to the apparatus 2a (step S31).

The encryption apparatus 2a stores the frame received from the terminal side transmitting/receiving section (the reference numeral 21 in FIG. 20) in the frame storing memory (the reference numeral 22 in FIG. 20), and the frame is identified by the protocol identifying section (the reference numeral 26 in FIG. 20) as an RIP frame for being sent to the terminal from the network side transmitting/receiving section (the reference numeral 23 in FIG. 20) (step S32). The router 4a, having received the RIP request (step S33), searches for the routing table, and sends the response to the encryption apparatus 2a (step S34).

The encryption apparatus 2a stores the frame received from the network side transmitting/receiving section (the reference numeral 23 in FIG. 20) in the frame storing memory (the reference numeral 22 in FIG. 20), and the frame is identified by the protocol identifying section (the reference numeral 26 in FIG. 20) as an RIP frame for being sent to the terminal from the terminal side transmitting/receiving section (the reference numeral 21 in FIG. 20) (step S35). The client 12c receives the RIP response (step S36). The client 12c (with an encryption system) starts communicating with the server 11s (with a non-encryption system) (step S46).

The encryption apparatus 2a stores the frame for the server 11s received from the terminal side transmitting/ receiving section in the frame storing memory (the reference numeral 22 in FIG. 20). The frame stored therein is identified by the protocol identifying section (the reference numeral 26 in FIG. 20) as a data frame for transfer to the data encrypting/decrypting section (the reference numeral 27 in FIG. 20). The data encrypting/decrypting section searches for the transparent processing address table 30a (the reference numeral 30 in FIG. 20), and it finds that the address of the server 11s is registered, so that the data section X 11 is sent to the network from the network side transmitting/receiving section (the reference numeral 23 in FIG. 20) without being encrypted (step S47). The encryption apparatus 2a sends the data frame received from the server 11s as it is to the network 3a without decrypting because the server 11s is registered in the transparent processing address table 30a, and the router 4a relays the data frame to the network 3b (step S48). The server 11s receives the data frame from the network 3b (step S49).

As described above, the client 12c (with an encryption system) executes cryptocommunications with the server 12s (having an encryption system), and can also execute non-cryptocommunications with the server 11s (having a non-encryption system).

Although an encryption system and a non-encryption system are discriminated in the service type according to Embodiment 1, in this embodiment, both of the systems are discriminated according to the number of Hops.

Figure 24:
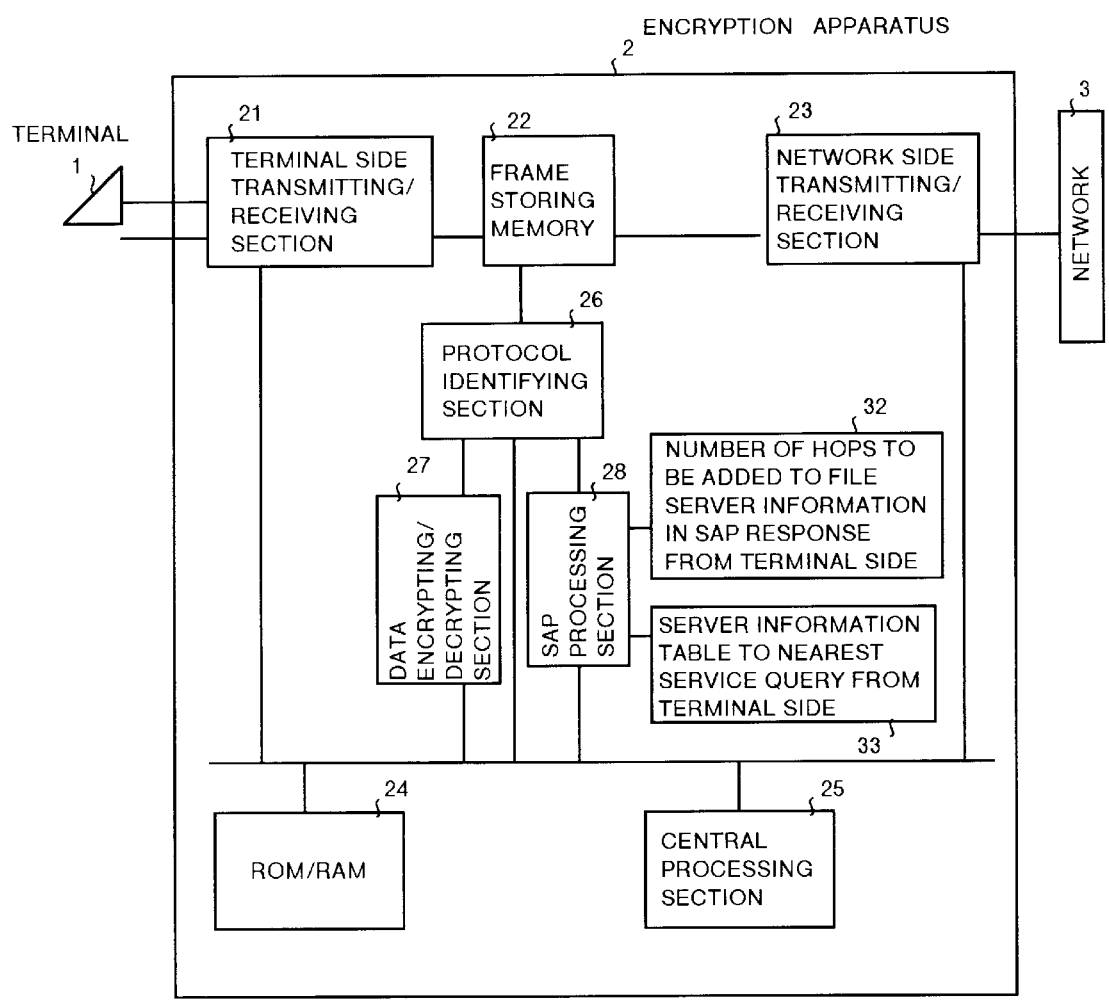
FIG. 24 is a view showing an encryption apparatus configuration according to Embodiment 3 of the present invention.

FIG. 24 shows configuration of the encryption apparatus. In FIG. 24, the reference numeral 32 indicates a memory for the number of Hops, which stores the number of Hops to be added to an SAP response received from the terminal side. The reference numeral 33 indicates a server information table, which stores server information for the servers to be connected, each previously registered therein, required for SAP requests of Nearest Service Query received from the terminal.

Reference numeral 28 indicates an SAP processing section, which sends the server information stored in the server information table 33 to the terminal side as the SAP response when it receives the SAP request of the Nearest Service Query from the terminal side, and aborts the SAP request when it receives the SAP request of the Nearest Service Query from the network.

Also, the SAP processing section 28, when it receives an SAP response from the terminal side, adds the contents of the memory 32 for the number of Hops to the number of Hops included in the SAP response for sending to the network side. Other sections in FIG. 24 are the same as those in FIG. 1, and thus a description thereof is omitted herein.

Figure 25:
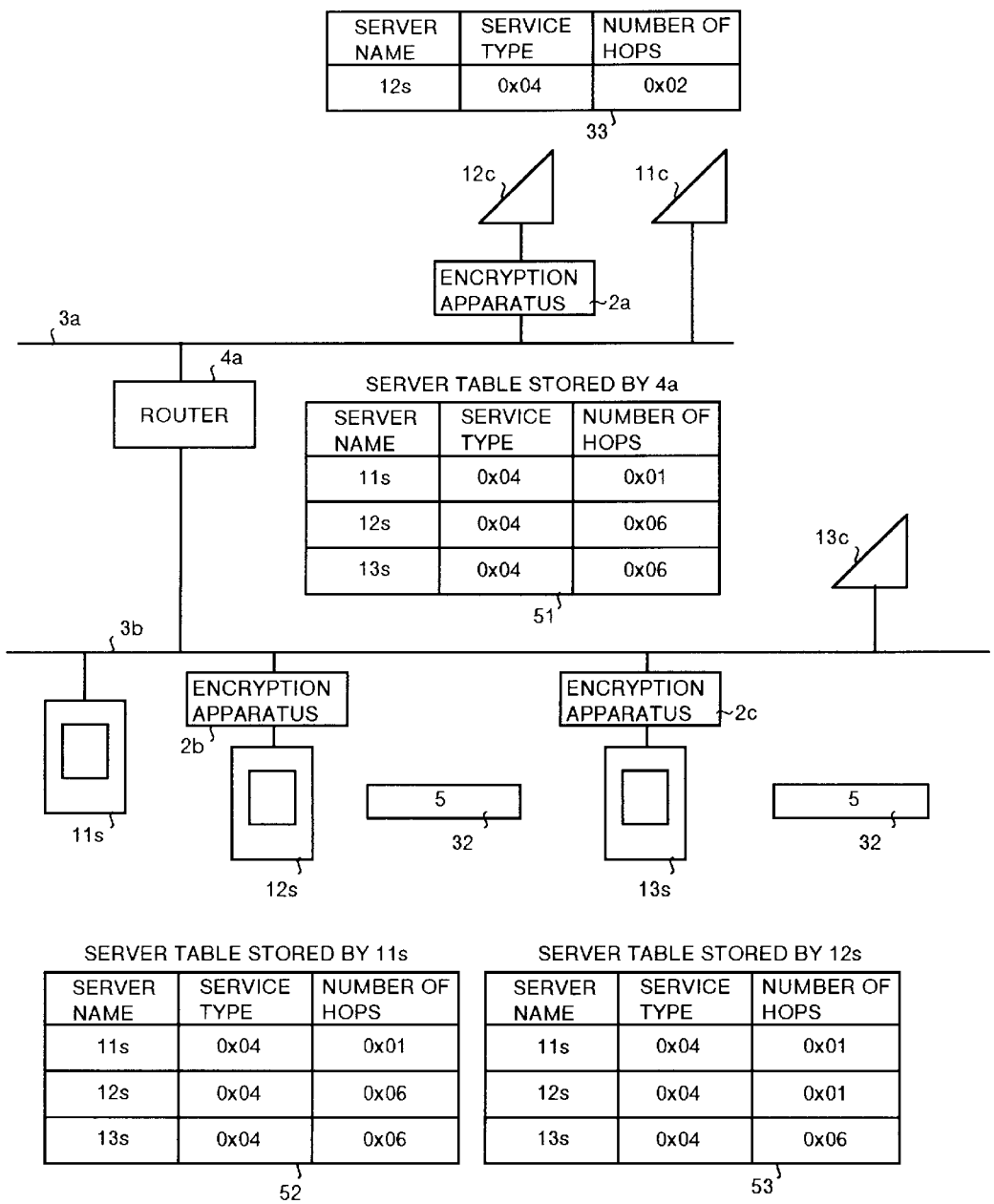
FIG. 25 is a view showing configuration of a cryptocommunication network according to Embodiment 3.

FIG. 25 shows network system configuration. In FIG. 25, reference numerals 11c, 12c, 11s, 12s, 13s, 2a, 2b, 2c, 3a, 3b, 4a, 51 to 53 are the same as those in FIG. 21. Reference numeral 33 is the same as that in FIG. 24, which indicates a server information table required for an SAP request of Nearest Service Query in the encryption apparatus 2a, specifically a table for storing server information for the server to which the apparatus 2a connects when initialized. In this embodiment, the description assumes a case where information for the server 12s with an encryption system (server name 12s, service type 0×04, the number of Hops 0×02) is registered in the server information for Nearest Service Query sent from the terminal of the encryption apparatus 2a.

The reference numeral 32 is the same as that in FIG. 24, which indicates a memory storing the number of Hops to be added to an SAP response from the encryption apparatus 2b, and a description of the embodiment assumes an example of registering 5 therein.

Figure 26:
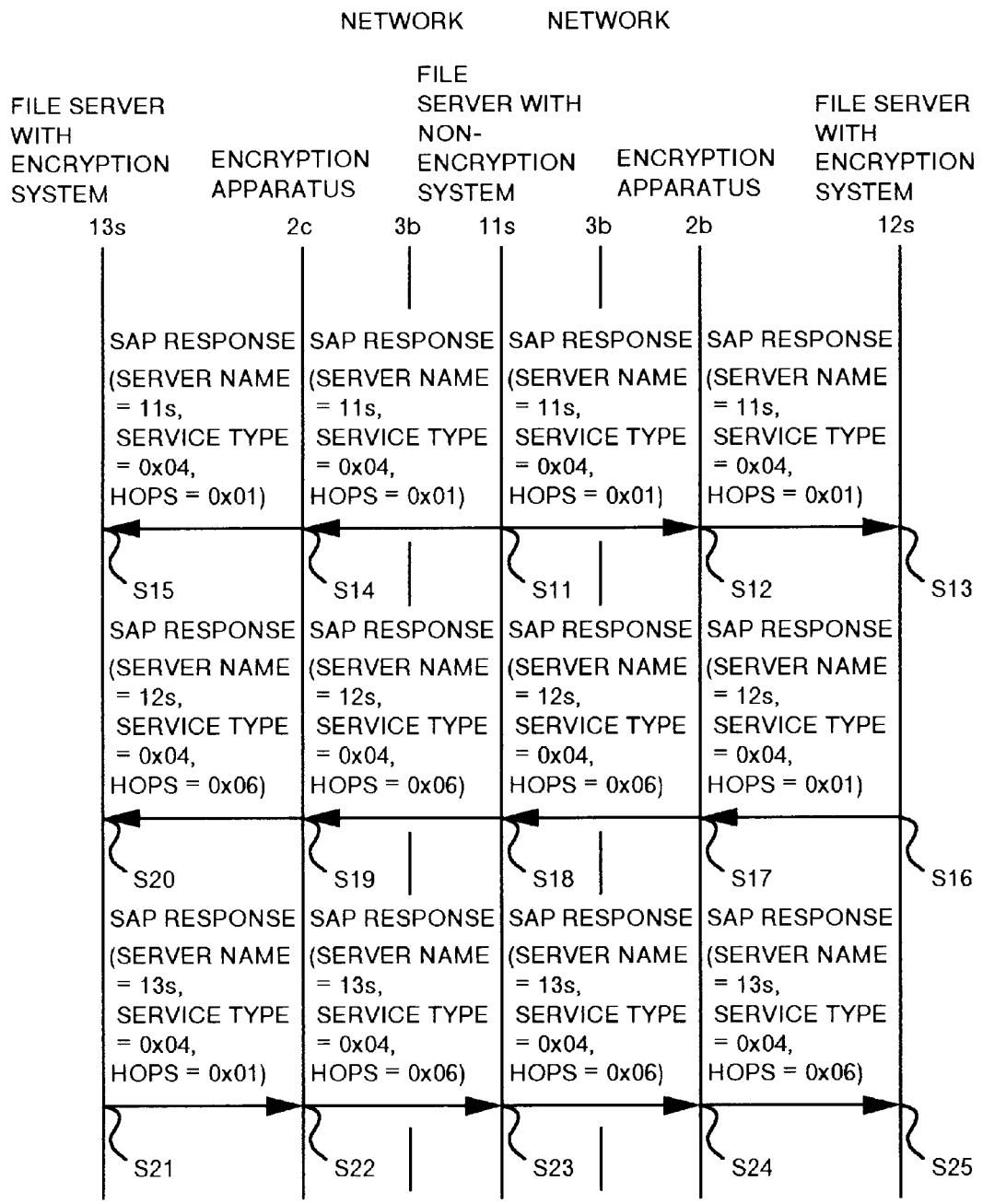
FIG. 26 is a sequence diagram showing a case where a server periodically transmits its server information in the cryptocommunication system according to Embodiment 3.

Next, the operation of this embodiment is described. In the network system configuration shown in FIG. 25, FIG. 26 shows a sequence in which each of the servers 11s, 12s, 13s periodically sends server information to the network.

In the figure, the server 11s (with a non-encryption system) periodically broadcasts the server information such as the server name 11s, service type 0×04, the number of Hops 0×01 to the network (step S11). The encryption apparatus 2b stores the frame received from the network side transmitting/receiving section (the reference numeral 23 in FIG. 24) in the frame storing memory (the reference numeral 22 in FIG. 24), and the frame is identified as an SAP frame by the protocol identifying section (the reference numeral 26 in FIG. 24) for transfer to the SAP processing section (the reference numeral 28 in FIG. 24). The SAP processing section determines that the frame is to be sent as it is, and the frame is sent to the terminal, namely to the server 12s (with an encryption system) from the terminal side transmitting/receiving section (the reference numeral 21 in FIG. 24) (step S12).

The server 12s (with an encryption system) receives the server information, and registers the server information such as the server name 11s, the service type 0×04, and the number of Hops 0×01 in the server table 53 (step S13).

The encryption apparatus 2c sends the frame to the server 13s as it is, like that in the encryption apparatus 2b (step S14). The server 13s (with an encryption system) receives the server information therefrom, and registers the server information such as the server name 11s, the service type 0×04, and the number of Hops 0×01 in the server table (step S15).

The server 12s periodically broadcasts its own server information such as the server name 12s, the service type 0×04, and the number of Hops 0×01 (step S16).

The encryption apparatus 2b stores the frame received from the terminal side transmitting/receiving section (the reference numeral 21 in FIG. 24) in the frame storing memory (the reference numeral 22 in FIG. 24), and the frame is identified as an SAP frame by the protocol identifying section (the reference numeral 26 in FIG. 24) for transfer to the SAP processing section (the reference numeral 28 in FIG. 24). The SAP processing section adds the number of Hops registered in the memory 32 (5 in this case) to the file server information from the terminal, specifically to the number of Hops included in the SAP response frame (SP9 in FIG. 5), and sends the information to the network 3b from the network side transmitting/receiving section (the reference numeral 21 in FIG. 24) (step S17).

The server 11s receives the server information such as the server name 12s, the service type 0×04, and the number of Hops 0×06 and registers them in the server table 52 (step S18).

The encryption apparatus 2c determines that the received server information is to be sent as it is to the server 13s by the SAP processing section, and sends it to the server 13s (step S19).

The server 13s receives the server information therefrom, and registers the server information such as the server name 12s, the service type 0×04, and the number of Hops 0×06 in the server table (step S20).

The server 13s periodically broadcasts its own server information according to the same sequence as that for the reception of the server information for the server 12s. The server 11s registers the server information such as the server name 13s, the service type 0x04, and the number of Hops 0x06 in the server table 52. The server 12s registers the server information such as the server name 13s, the service type 0x04, and the number of Hops 0x06 in the server table 53 (step S21 to step S25).

It should be noted that description of the router 4a is omitted in the description of FIG. 26 above. The router 4a, however, updates the server table 51 according to the server information received from the network 3b. Specifically, the router 4a receives the server information for the server 11s such as the server name 11s, the service type 0x04, and the number of Hops 0x01 from the network 3b and registers them in the server table 51.

Also, the router 4a receives the server information for the server 12s such as the server name 12s, the service type 0x04, and the number of Hops 0x06 from the network 3b and registers such information in the server table 51. The router 4a also receives the server information for the server 13s such as the server name 13s, the service type 0x04, and the number of Hops 0x06 from the network 3b and registers such information in the server table 51.

As described above, the servers and the router in the network learn the server information indicated by the reference numerals 51, 52, 53 shown in FIG. 25.

In the network system shown in FIG. 25, the sequence processed when the client 1c (with a non-encryption system) starts up is the same as that in FIG. 11. In FIG. 11, the router 4a, upon receiving the SAP request of Nearest Service Query from the client 11c, sends the server information for the smallest number of Hops (in this example, the server name 11s, the service type 0x04, the number of Hops 0x01) stored in the server table 51 to the network as the SAP response, so that the router 4a always sends thereto information for the server 11s for the SAP request of Nearest Service Query from the client 22c with a non-encryption system. In the encryption system, the number of Hops (e.g., 5) is added to the information in the encryption apparatus to be the number of Hops larger than that in the non-encryption system and the larger one is excluded in the process. Consequently, non-cryptocommunications can be executed in the same network in which terminals with an encryption system and those with a non-encryption system are mixed.

Figure 27:
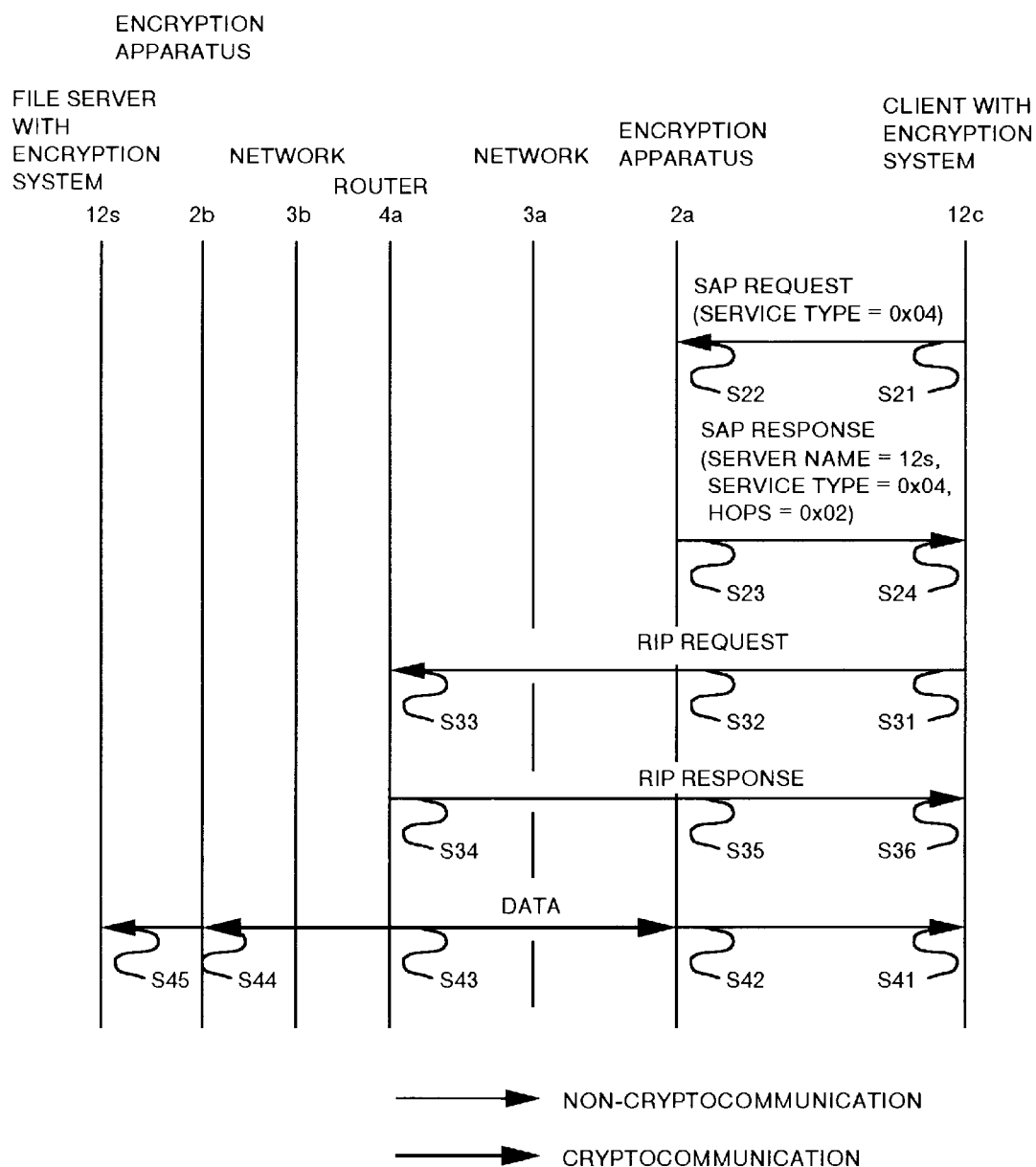
FIG. 27 is a sequence diagram with a client with an encryption system is initialized in the cryptocommunication system according to Embodiment 3.

In the network system shown in FIG. 25, FIG. 27 shows a processing sequence for the client 12c (with an encryption system) from initialization until starting communications with the server 12s (having an encryption system). In the figure, the client 12c sends an SAP request of Nearest Service Query with the service type 0x04 when initialized (step S21), and the encryption apparatus 2a receives the request. The encryption apparatus 2a receives the frame from the terminal side transmitting/receiving section (the reference numeral 21 in FIG. 24) and stores the frame in the frame storing memory (the reference numeral 22 in FIG. 24). The frame is identified as an SAP frame of section (the reference numeral 21 in FIG. 24) and stores the frame in the frame storing memory (the reference numeral 22 in FIG. 24). The frame is identified as an SAP frame of Nearest Service Query by the protocol identifying section (the reference numeral 26 in FIG. 24) for transfer to the SAP processing section (the reference numeral 28 in FIG. 24). The SAP processing section prepares an SAP response frame according to the server information of, in this example, the server name 12s, service type 0x04, and the number of Hops 0x02, each previously set in the server information table 53 (the reference numeral 33 in FIG. 24) required for the SAP request of Nearest Service Query sent from the terminal, and sends the information to the client 12c from the terminal side transmitting/receiving section (step S23).

The client 12c receives the SAP response frame (step S24) and sends an RIP request frame for a network number (SP6 in FIG. 5) of the server set in the SAP response frame (step S31).

The encryption apparatus 2a receives the frame from the terminal side transmitting/receiving section (the reference numeral 21 in FIG. 24), and stores the frame in the frame storing memory (the reference numeral 22 in FIG. 24). The frame is identified as an RIP frame by the protocol identifying section (the reference numeral 26 in FIG. 24) and is sent as it is to the network from the network side transmitting/receiving section (step S32).

The router 4a receives the RIP request (step S33), and sends a response (step S34).

The encryption apparatus 2a receives the frame from the network side transmitting/receiving section (the reference numeral 23 in FIG. 24), and stores the frame in the frame storing memory (the reference numeral 22 in FIG. 24). The frame is identified as an RIP frame by the protocol identifying section (the reference numeral 26 in FIG. 24) and is sent as it is to the terminal from the terminal side transmitting/receiving section (step S35), and the client 12c with an encryption system receives it (step S36).

The client 12c with an encryption system starts communicating with the server 12s according to the RIP response (step S41). The encryption apparatus 2a receives the frame from the terminal side, stores the frame in the frame storing memory (the reference numeral 22 in FIG. 24), and transfers the frame to the protocol identifying section (the reference numeral 26 in FIG. 24). The frame is identified as a data frame by the protocol identifying section, and the sections after the data section (X11 in FIG. 2) in the frame are encrypted for being sent (step S42). The router 4a sends the frame to the receiver's address according to the routing table (step S43).

The encryption apparatus 2b receives the frame from the network side, stores the frame in the frame storing memory (the reference numeral 22 in FIG. 24), and transfers the frame to the protocol identifying section (the reference numeral 26 in FIG. 24). The frame is identified as a data frame by the protocol identifying section, and the data section (X11 in FIG. 2) in the frame is decrypted for being sent to the server (step S44). The server 12s (with an encryption system) receives the information (step S45).

The data is sent from the server 12s to the client 12c according to processing of step S41 to step 45 in reverse order.

As described above, an encryption apparatus accommodating clients specifies a server with an encryption system for initialization, so that a server with an encryption system can be connected to a client with an encryption system.

Figure 28:
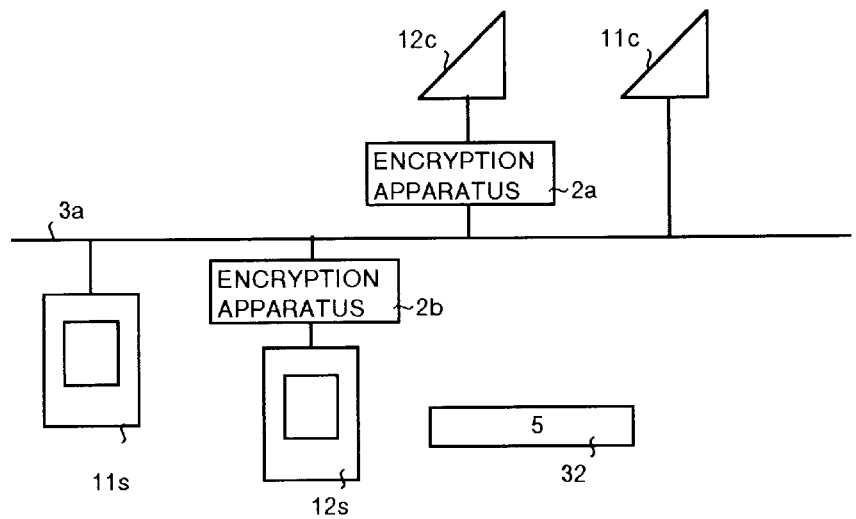
FIG. 28 is a view showing configuration of a cryptocommunication system without a router according to Embodiment 3.
Figure 29:
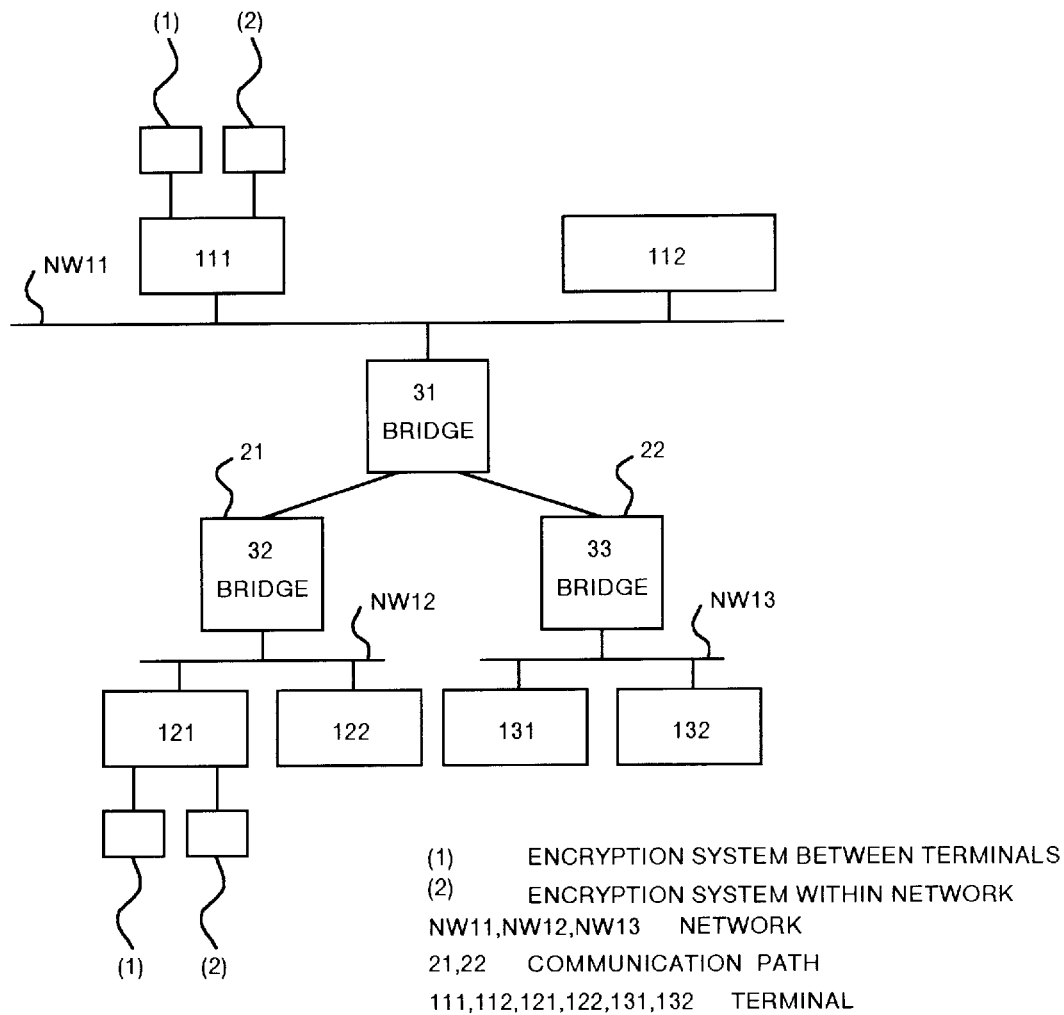
FIG. 29 is a view showing configuration of a communication network according to the conventional technology.
Figure 30:
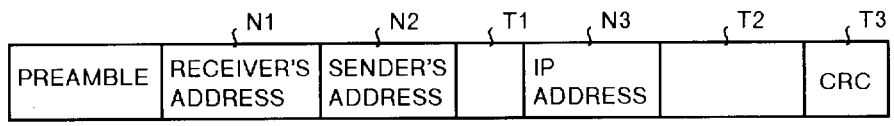
FIG. 30 is a view showing a range for encrypting a frame according to the conventional technology.

Also, even the system configuration has no router as shown in FIG. 28, the encryption apparatus 2b connected to the server 12s (with an encryption system) aborts an SAP request of Nearest Service Query to the request thereof from the client 11c, and the server 11s (with a non-encryption system) tells the server name 11s having a smallest number of Hops in its own server table to the client 11c, so that a server with a non-encryption system and a client with a non-encryption system can be connected.

As described above, the number of Hops of the server with an encryption system is made to be a larger value, and when a client with a non-encryption system is initialized, any of the servers or a router having received an SAP request of Nearest Service Query selects a server having a smaller number of Hops to report to the client, while an encryption apparatus aborts the SAP request of Nearest Service Query from the network, so that the server with a non-encryption system and the client with a non-encryption system can be connected while avoiding selection of a server with an encryption system.

Accordingly, crypto- or non-cryptocommunications can be executed in a network in which terminals with an encryption system and those with a non-encryption system are mixed.

In this embodiment, the description assumes an example of applying the present invention in a bus type LAN. The same effect, however, can be achieved through a ring type LAN or WAN. Also, the same effect can be obtained in a case where any network is connected to a terminal side transmitting/receiving section and encrypting or decrypting is executed when information is to be relayed to the network.

This application is based on Japanese patent application No. HEI 8-169950 filed in the Japanese Patent Office on Jun. 28, 1996, the entire contents of which are hereby incorporated by reference.

Although the invention has been described with respect to specific embodiments for a complete and clear disclosure, the appended claims are not to be thus limited but are to be construed as embodying all modifications and alternative constructions that may occur to one skilled in the art which fairly fall within the basic teaching herein.

What is claimed is:

1. A method for use in an encryption apparatus, said method comprising:

receiving service type information from a network signifying whether a sending device is a non-encryption device or an encryption device;

converting the received service type information when such information signifies an encryption device to service type information signifying a non-encryption device; and preventing data communication with the sending device when the received service type information signifies a non-encryption device.

2. The method of claim 1, wherein said sending device is a file server.

3. The method of claim 2, further comprising:

storing the results of said converting step in a server table.

4. The method of claim 1, wherein said sending device is a client terminal.

5. The method of claim 1, wherein said sending device is a router.

6. The method of claim 1, wherein said preventing step includes:

transmitting a reply to said sending device via said network signifying that a connected device is unusable.

7. The method of claim 1, wherein said preventing step includes:

changing a hop value for a connected device to a value which, when transmitted to said sending terminal, signifies that said connected device is unusable.

8. The method of claim 1, further comprising:

receiving service type information from a connected device, signifying that said connected device is a non-encryption device;

converting the service type information received from said connected device to signify that said connected device is an encryption device; and outputting the converted service type information for said connected device to said network.

9. The method of claim 8, wherein said sending device receives the converted service type information for said connected device, and aborts a service request when the service type information for said connected device indicates an encryption device.

10. The method of claim 1, further comprising:

receiving a data frame from a connected device;

encrypting at least a portion of said data frame;

sending the result of said encrypting step to said network;

receiving encrypted data from said network; and decrypting said encrypted data.

11. A method for use in an encryption apparatus, said method comprising:

storing at least one non-encryption address in a transparent processing table corresponding to a device which is not capable of decryption;

receiving a control frame, including address and service type information, from a service requesting device via a network connection;

comparing the address information of the control frame with entries in the transparent processing table;

selectively changing the service type information of the control frame when said comparing step indicates that the address information of the control frame does not match entries in the transparent processing table; and determining whether to encrypt data for transmission to said service requesting device based on the service type information output by said selective changing step.

12. The method of claim 11, wherein said service requesting device is a base server connected via a network to terminal which does not have encryption capability.

13. The method of claim 11, further comprising:

storing server information related to a server for which encryption is not required.

14. A method for use in an encryption apparatus, said method comprising:

receiving server information from a connected device signifying a hop number for the connected device;

incrementing the hop number for the connected device; and transmitting the incremented hop number to a remote device via a network connection;

wherein, based on the incremented hop number, a service requesting device without decryption capability avoids selecting the connected device.

15. The method of claim 14, wherein the connected device is a server with encryption capability.

16. The method of claim 14, wherein said requesting device is a client terminal without encryption capability.

17. An apparatus for implementing an encryption scheme, said apparatus comprising:

a network side receiving section for receiving service type information from a network signifying whether a sending device is a non-encryption device or an encryption device;

conversion means for converting the received service type information when such information signifies an encryption device to service type information signifying a non-encryption device; and means for preventing data communication with the sending device when the received service type information signifies a non-encryption device.

18. An encryption apparatus according to claim 17, wherein said encryption apparatus is applied in bus type or ring type LAN (local area network) or WAN (wide area network).

19. The apparatus of claim 17, wherein said sending device is a file server.

20. The apparatus of claim 19, further comprising:
a server table for storing the results of said conversion means.

21. The apparatus of claim 17, wherein said sending device is a client terminal.

22. The apparatus of claim 17, wherein said sending device is a router.

23. The apparatus of claim 17, wherein said means for preventing transmits a reply to said sending device via said network signifying that a connected device is unusable.

24. The apparatus of claim 17, wherein said means for preventing changes a hop value for a connected device to a value which, when transmitted to said sending terminal, signifies that said connected device is unusable.

25. The apparatus of claim 17, further comprising:
a terminal side receiving section for receiving service type information from a connected device, signifying that said connected device is a non-encryption device, said conversion means converting the service type information received from said connected device to signify that said connected device is an encryption device; and
output means for outputting the converted service type information for said connected device to said network.

26. The apparatus of claim 25, wherein said sending device receives the converted service type information for said connected device, and aborts a service request when the service type information for said connected device indicates an encryption device.

27. The apparatus of claim 17, further comprising:
a terminal side receiving section for receiving a data frame from a connected device;
encryption means for encrypting at least a portion of said data frame;
output means for sending the result of said encryption means to said network; and
decryption means for decrypting encrypted data received from said network.

28. An apparatus for implementing an encryption scheme, said apparatus comprising:
a transparent processing table storing at least one non-encryption address corresponding to a device which is not capable of decryption;
a network side receiving section for receiving a control frame, including address and service type information, from a service requesting device via a network connection;
a processing section for comparing the address information of the received control frame with entries in said transparent processing table and selectively changing the service type information of the control frame when the address information of the control frame does not match entries in said transparent processing table; and
encryption means for selectively encrypting data for transmission to said service requesting device based on the service type information output by said processing section.

29. An encryption apparatus according to claim 28, wherein said encryption apparatus is applied in bus type or ring type LAN (local area network) or WAN (wide area network).

30. The apparatus of claim 28, wherein said service requesting device is a base server connected via a network to terminal which does not have encryption capability.

31. The apparatus of claim 28, further comprising:
a server table storing server information related to a server for which encryption is not required.

32. An apparatus for implementing an encryption scheme, said apparatus comprising:
a processing section for receiving server information from a connected device signifying a hop number for the connected device and incrementing the hop number for the connected device; and
a network side transmitting section for transmitting the incremented hop number to a remote device via a network connection;
wherein, based on the incremented hop number, a service requesting device without decryption capability avoids selecting the connected device.

33. An encryption apparatus according to claim 32, wherein said encryption apparatus is applied in bus type or ring type LAN (local area network) or WAN (wide area network).

34. The apparatus of claim 32, wherein the connected device is a server with encryption capability.

35. The apparatus of claim 32, wherein said requesting device is a client terminal without encryption capability.

* * * * *